United States Patent [19]

Tajima et al.

[11] Patent Number: 4,727,391
[45] Date of Patent: Feb. 23, 1988

[54] SHEET FILM PACKAGE AND DEVICE FOR LOADING SHEET FILMS

[75] Inventors: Kenji Tajima; Motoaki Takahashi; Hideo Watanabe; Takashi Shoji; Noboru Arai, all of Kanagawa, Japan

[73] Assignee: Fuji Photo Film Co., Ltd., Kanagawa, Japan

[21] Appl. No.: 7,249

[22] Filed: Jan. 27, 1987

[30] Foreign Application Priority Data

| Jan. 24, 1986 | [JP] | Japan | 61-14486 |
| Feb. 12, 1986 | [JP] | Japan | 61-18604[U] |
| Mar. 5, 1986 | [JP] | Japan | 61-50037 |
| Mar. 5, 1986 | [JP] | Japan | 61-50038 |
| Mar. 5, 1986 | [JP] | Japan | 61-50039 |
| Mar. 5, 1986 | [JP] | Japan | 61-50040 |
| Mar. 5, 1986 | [JP] | Japan | 61-50041 |
| Mar. 5, 1986 | [JP] | Japan | 61-33088[U] |
| Mar. 12, 1986 | [JP] | Japan | 61-55489 |
| Mar. 12, 1986 | [JP] | Japan | 61-36888[U] |

[51] Int. Cl.$^4$ .................................................. G03B 17/26
[52] U.S. Cl. .................................. 354/277; 206/455; 378/182
[58] Field of Search ............ 354/276, 277; 378/169, 378/182; 206/455

[56] References Cited

U.S. PATENT DOCUMENTS

| 330,182 | 11/1885 | Wilcox | 206/455 X |
| 1,098,844 | 6/1914 | Schmuck | 354/277 X |
| 1,536,345 | 5/1925 | Jones et al. | 378/182 X |

Primary Examiner—L. T. Hix
Assistant Examiner—Brian W. Brown
Attorney, Agent, or Firm—Sughrue, Mion, Zinn, Macpeak, and Seas

[57] ABSTRACT

A sheet film package includes a tray for storing a stack of sheet films and a flexible cover member peelably attached to the tray in covering relation to a film access opening for shielding the sheet films in the tray from extraneous light. The cover member is folded back on itself at one end of the tray and has an end portion which extends over the other end of the tray and which will be exposed from a loading device when the sheet film package is loaded in the loading device. The sheet film package may have a cushioning member disposed in the tray and composed of hollow air bags of a flexible material for pressing and holding the sheet films in the package member. A film loading device for loading the sheet film package therein include a light-shielding member for preventing extraneous light from entering a loading slot. The loading slot is closed by a pivotally mounted cover with the end portion of the cover member being led out of the loading slot. The light-shielding member may comprise a roller for pressing the cover member against an engaging portion of the sheet film package or the cover, or may comprise light-shielding blocks mounted on the cover and a frame of the device, respectively, for gripping the cover member therebetween.

26 Claims, 37 Drawing Figures

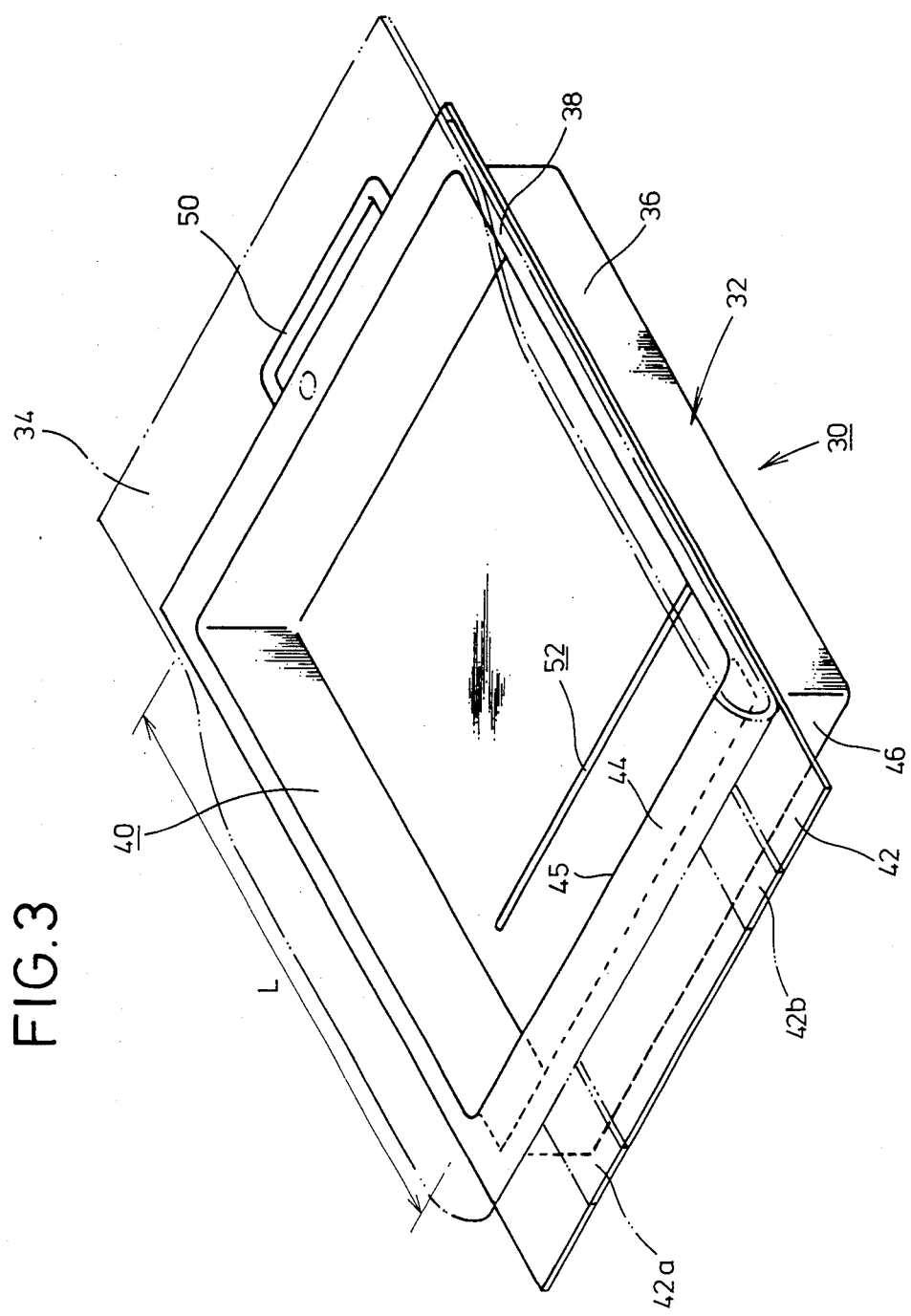

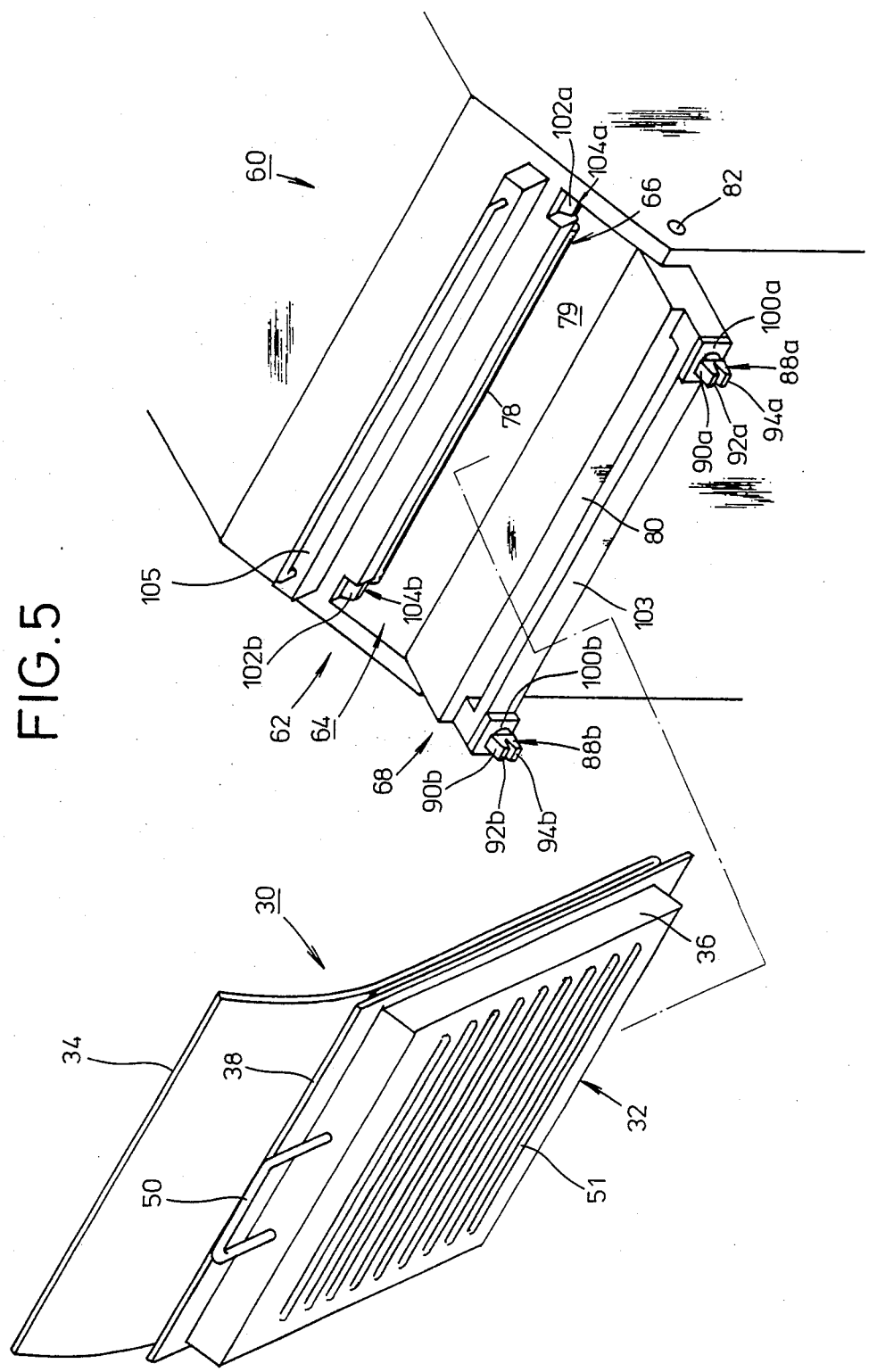

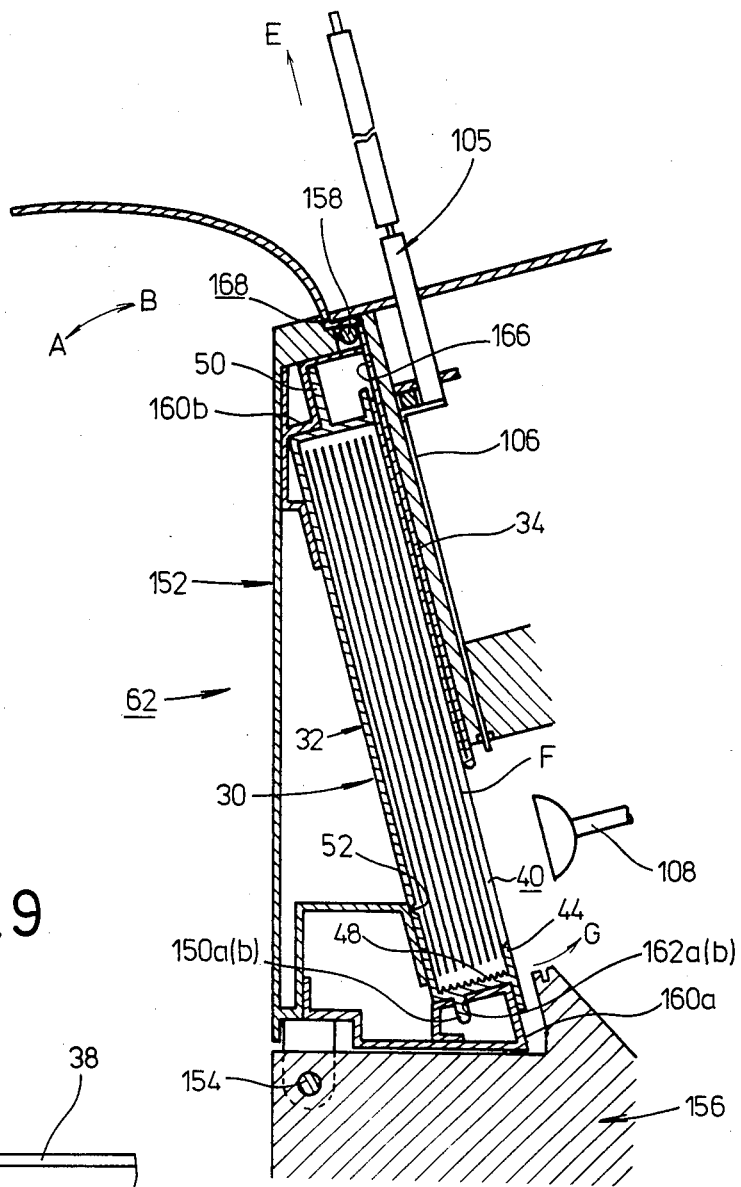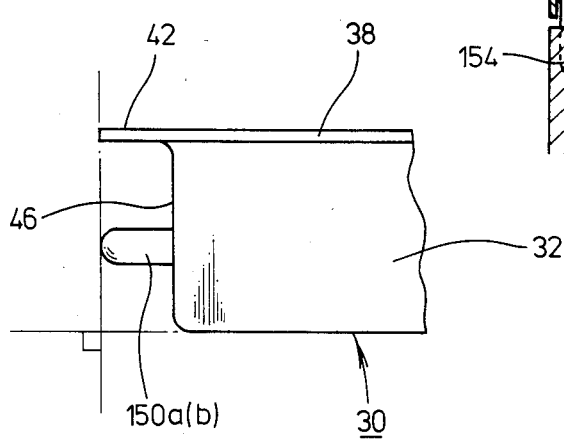

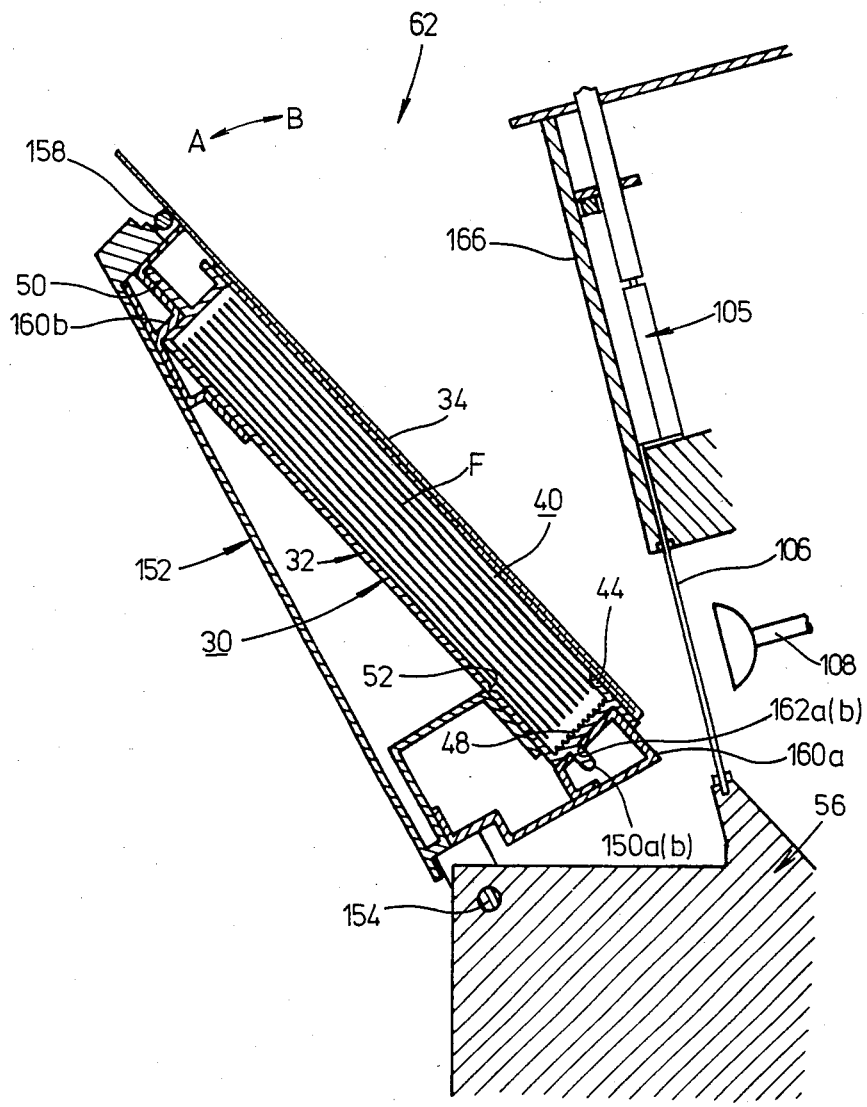

SHEET FILM PACKAGE AND DEVICE FOR LOADING SHEET FILMS

BACKGROUND OF THE INVENTION

The present invention relates generally to a sheet film package and a device for loading sheet films, and more particularly to a sheet film package comprising a tray for storing a plurality of sheet films therein and a light-shielding cover peelably attached to the tray and closing a film access opening, and a cassette loading device in which the cover is peeled off the tray under light-shielding conditions for opening the film access opening, so that the sheet films can be loaded in a bright room.

X-ray films are widely used in the medical field for photographing objects such as human bodies with X rays for medical diagnosis. For photographing an object on such an X-ray film, it has been customary to load the X-ray film into an X-ray photographing device under a light-shielded environment and exposed the emulsion layer of the film directly to an X ray having passed through the object for recording the image of the object thereon.

There has recently been developed and widely used a radiation image recording and reproducing system for producing the radiation-transmitted image of an object using a stimulable phosphor material capable of emitting light upon exposure to stimulating rays. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded on a recording medium such as a photosensitive material or displayed as a visible image on a CRT or the like.

The visible image thus produced may be recorded on a recording medium by an image recorder such as an image output laser printer, for example. In the image output laser printer, photographic films stored as a recording material in a magazine are loaded, and taken out one by one by a sheet delivery device such as a suction disk. Thereafter, the film is exposed to a laser beam modulated by an electric signal produced from the stimulable phosphor sheet for recording an image on the film. The exposed film is then transferred into an automatic developing device and processed thereby to develop the image. The film is thereafter stored in a prescribed place for use in medical disgnosis when required.

When loading the films into the image output laser printer, they must not be exposed to extraneous light. Therefore, it is general practice to load the films into the image output laser printer in a dark room, but the efficiency of such a loading process is low. There is a strong demand for the loading of films under bright conditions such as in an ordinary bright room, and various methods have been proposed for loading films in bright environments. One such method is disclosed in Japanese Laid-Open Utility Model Publication No. 56(1981)-07931.

FIG. 1a illustrates in cross section a conventional sheet film magazine 1 to be loaded into an X-ray photographing device. The film magazine 1 includes a casing 2 and a cover 3 openably hinged to the casing 2, the casing 2 and the cover 3 jointly defining a chamber 4. Gripper rollers 5a, 5b are rotatably supported respectively on the casing 2 and the cover 3. A light-shielding member 6 is disposed between the casing 5 and the cover 6 for preventing extraneous light from entering the chamber 4 through the gripper rollers 5a, 5b.

The cover 3 has a film access opening 7 that can be opened and closed by a shutter 8 mounted in the cover 3, the shutter 8 having a bent grip 9 on one end thereof. A sheet film package 10 is housed in the magazine 1. The sheet film package 10 accommodates a plurality of unexposed sheet films 12 protected by cardboard 11. The sheet film package 10 has opposite ends 10a, 10b exposed out of the magazine 1.

For loading the sheet film package 10 under a bright condition, the end 10a of the package 10 is engaged by the grip 9 of the shutter 8, and the other end 10b is cut off by scissors or the like. Then, the magazine 1 is loaded into an X-ray photographing device 13 (FIG. 1b), and the shutter 8 is manually pulled from the magazine 1.

As a result, the package 10 is engaged by the grip 9 and drawn out of the magazine 1. Since the package 10 is gripped by the gripper rollers 5a, 5b, the unexposed films 12 are left in the chamber 4. As the shutter 8 is pulled out, the film access opening 7 is opened to expose the chamber 4 of the magazine 1 into the X-ray photographing device 13.

The unexposed films 12 are successively attracted by a suction device or suction disk 14 and delivered to a prescribed photographing position.

Another known device is disclosed in Japanese Laid-Open Utility Model Publication No. 56(1981)-05141. FIG. 2a shows in cross section a disclosed sheet film package 15 to be supplied to an X-ray photographing device. The film package 15 includes a light-shielded or sunproof container 17 in the form of a box having an opening 16. The light-shielded container 17 contains a pluraltiy of unexposed films 19 protected by cardboard 18. A flexible light-shielding member 20 is applied over the opening 16 in light-shielding relation to protect the unexposed films 19 from exposure to extraneous light. One end of the flexible light-shielding member 20 is curved upwardly and has an engagement hole 20a defined near its edge.

The film package 15 of the above construction is positioned by a storage unit 22 housed in a magazine 21 as shown in FIG. 2b. The magazine 21 has a shutter 23 having an engagement pin 24 mounted on one end thereof. After the engagement pin 24 has engaged in the hole 20a of the flexible light-shielding member 20, the magazine 21 is loaded into an X-ray photographing device (not shown), and the other end of the shutter 23 is pulled out of the magazine 21 by fingers. As a result, the flexible light-shielding member 20 is peeled off the container 17 by the pin 24 engaging the hole 20a, and the opening 16 is opened in the X-ray photographing device. The uppermost unexposed film 19 is then attracted by a suction device 25 and delivered through the opening 16 into a given photographing position.

With the illustrated conventional device, however, the dedicated magazine 21 must be used to store the film package 15. This magazine must be of a rugged construction capable of withstanding stresses due to repeated attachment and removal thereof, and hence is considerably heavy. Therefore, it is laborsome for the operator to load and unload the magazine. The magazine is also considerably expensive since it has a shutter mechanism. Where various films of different sizes are to be employed, there must be used as many dedicated magazines as the number of those different film sizes, and the cost of manufacture is so high that they are economically infeasible in reality.

In order to load the films into the X-ray photographing device, it is necessary to attach the shutter to the end of the film package or the light-shielding member, and pulling out the shutter after the magazine has been placed into the device. As a consequence, the film loading process of the above nature is tedious and considerably time-consuming.

SUMMARY OF THE INVENTION

Therefore, it is an object of the present invention to provide a sheet film package including a tray for accommodating a stack of sheet films and a flexible light-shielding cover member peelably fixed to the tray, with the cover member being bent at one end, and also a device for loading such sheet films into an image recording apparatus in a bright environment by selecting the length of the cover member such that one end thereof is exposed out of the device, and peeling the cover member off the tray under light-shielded conditions to open a film access opening in the tray, whereby the films can successively be delivered through the opening by a suction device, so that no conventional dedicated magazine is required and the films can be loaded with utmost ease under light-shielded conditions in a bright environment through a simple construction.

Another object of the present invention is to provide a sheet film package comprising a tray for storing a stack of sheet films, the tray having a film access opening, and a flexible cover member peelably attached to the tray in covering relation to the film access opening for shielding the sheet films in the tray from extraneous light, the cover member having a length selected such that it is folded back on itself at one end of the tray and has an end portion which extends over the other end of the tray and which will be exposed from a loading device when the sheet film package is loaded in the loading device.

Still another object of the present invention is to provide a sheet film package comprising a package unit for storing a stack of sheet films, and a cushioning member disposed in the package member and composed of a hollow air bag assembly of a flexible material for pressing and holding the sheet films in the package member.

Yet another object of the present invention is to provide a film loading device for loading therein a sheet film package storing a stack of sheet films and having a film access opening openably closed by a cover member, comprising a loading slot for loading the sheet film package therein, a cover for closing the loading slot, and light-shielding means disposed in one of the loading slot and the cover and biased toward the cover member, for gripping the cover member that is led out of the loading slot in a light-shielding condition.

A still further object of the present invention is to provide a film loading device for loading therein a sheet film package storing a stack of sheet films and having a film access opening openably closed by a cover member, comprising a loading slot for loading the sheet film package therein, a base for mounting the sheet film package thereon, a cover for closing the loading slot with one end of the cover member being exposed out of the film loading device, and light-shielding means for holding the sheet film package with the film access opening being opened, in a light-shielding condition in cooperation with the cover and/or the sheet film package.

A yet still further object of the present invention is to provide a film loading device for loading therein a sheet film package storing a stack of sheet films and having a film access opening openably closed by a cover member, the sheet film package having an engaging portion projecting outwardly from an end thereof, the film loading device comprising a loading slot for loading the sheet film package therein, a roller disposed in the vicinity of the loading slot for being pressed against the engaging portion to grip the cover member, and light-shielding means for opening and closing the loading slot and allowing an end of the cover member to be led out of the film loading device.

Still another object of the present invention is to provide a film loading device for loading therein a sheet film package storing a stack of sheet films and having a film access opening openably closed by a cover member, comprising a frame, a base pivotally mounted on the base for mounting the sheet film package thereon, and a pair of light-shielding blocks mounted on the frame and the base, respectively, for gripping an end of the cover member therebetween.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a perspective view, partly omitted from illustration, of a sheet film package according to the present invention;

FIG. 5 is a fragmentary perspective view of the sheet film package and a loading device;

FIG. 9 is a fragmentary side elevational view of the sheet film package illustrated in FIG. 8;

FIG. 10 is a fragmentary vertical cross-sectional view of the sheet film package of FIG. 8 and a loading device therefor;

FIG. 11 is a fragmentary vertical cross-sectional view showing the manner in which the sheet film package of FIG. 8 is loaded in the loading apparatus of FIG. 10;

DETAILED DESCRIPTION OF THE PREFERRED EMBODIMENTS

Figure 1A:
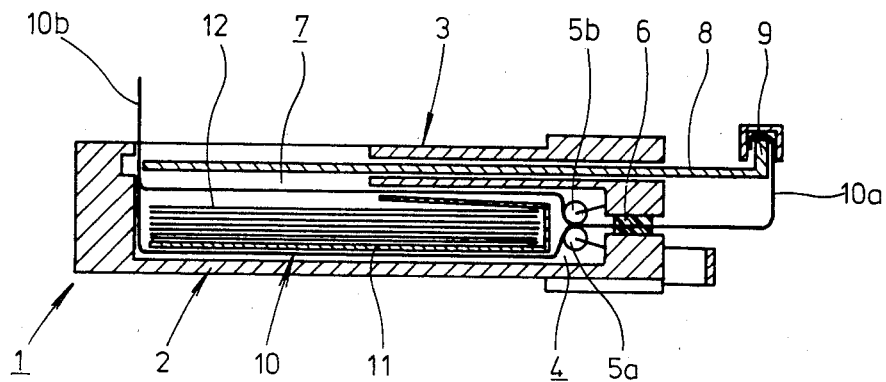
FIGS. 1a and 1b are cross-sectional views of a conventional film package.
Figure 1B:
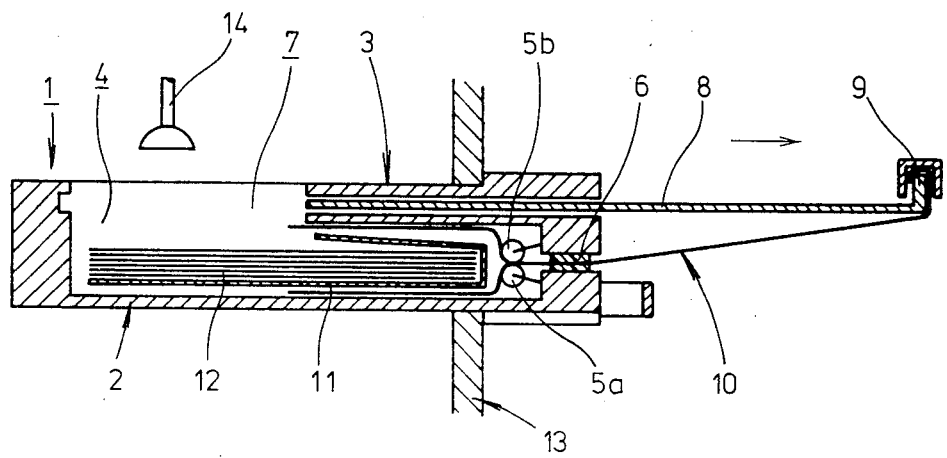
Figure 2A:
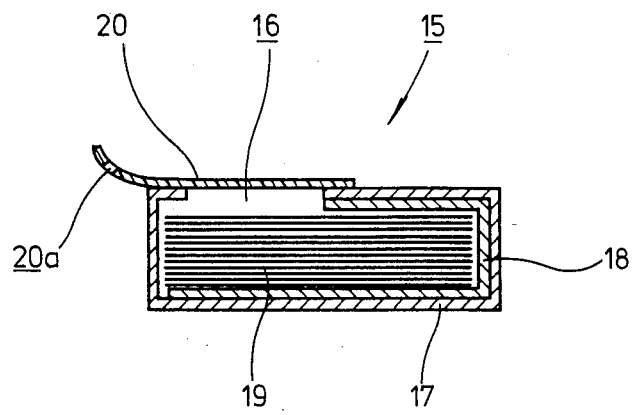
FIGS. 2a and 2b are cross-sectional views of another conventional film package.
Figure 2B:
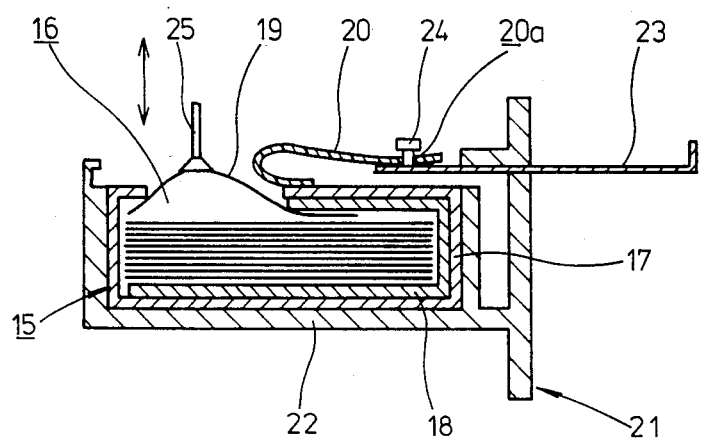

Like or corresponding parts are denoted by like or corresponding reference characters through several views.

Figure 4A:
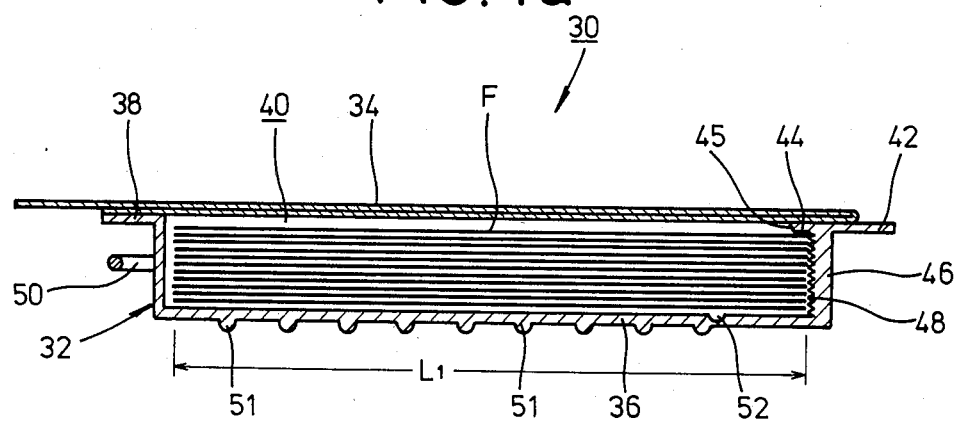
FIG. 4a is a vertical cross-sectional view of the sheet film package shown in FIG. 3.

As shown in FIG. 3, a sheet film package 30 according to the present invention comprises a tray 32 and a cover member 34 made of a flexible material. The tray 30 is of an integral structure including a lower box-shaped portion 36 and an upper plate-like portion 38 projecting outwardly from the lower portion 36. The upper portion 38 has a film access opening 40 defined therein. The upper portion 38 includes a surface portion 42 which will be a leading end when the package 30 is loaded into a loading device (described later), the surface portion 42 extending outwardly over a prescribed length for engagement with a presser means in the loading device. The surface portion 42 may be defined as two tongue portions 42a, 42b indicated by the two-dot-and-dash lines. The surface portion 42 has a plate-like engaging portion 44 projecting into the opening 40. As illustrated in FIG. 4a, the engaging portion 44 has on its distal edge a slanted or curved surface 45 directed away from sheet films F in the package 30 and inclined into the opening 40. The opening 40 is defined between the engaging portion 44 and one end of the upper portion 48 and has a length L smaller than the length L1 of the sheet films F stored in the lower portion 36.

Figure 4B:
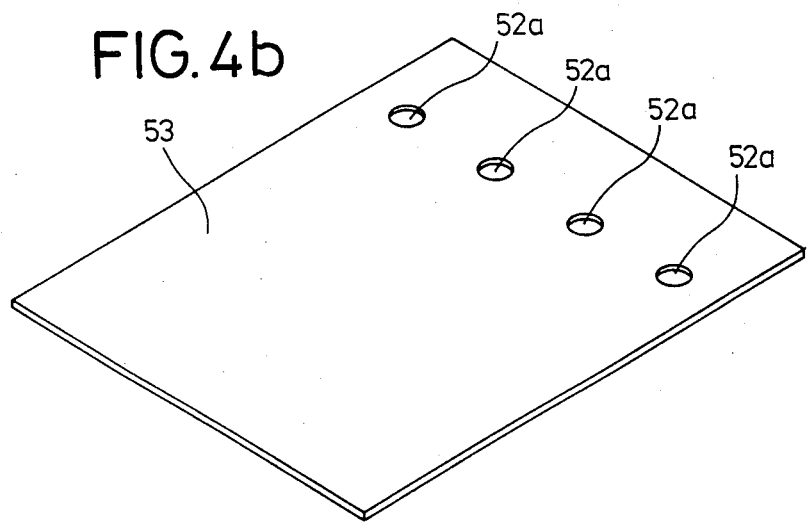
FIGS. 4b through 4d are perspective views of cardboard sheets serving as vent means stored in the sheet film package of FIG. 3.
Figure 4C:
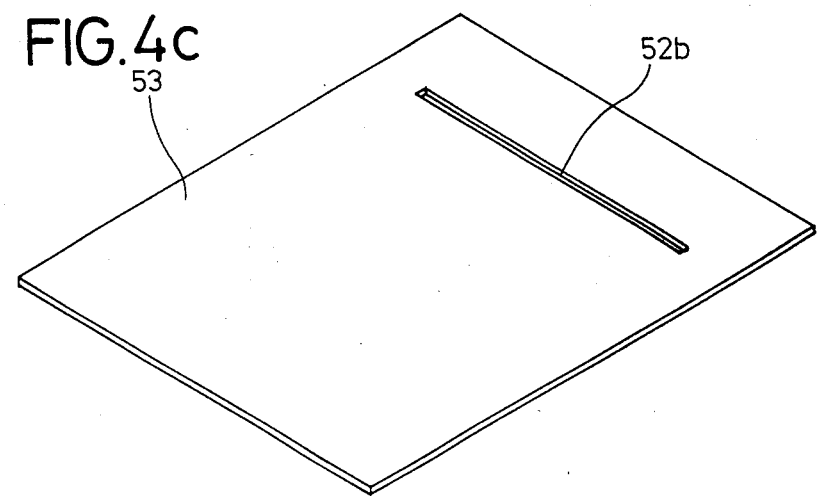
Figure 4D:
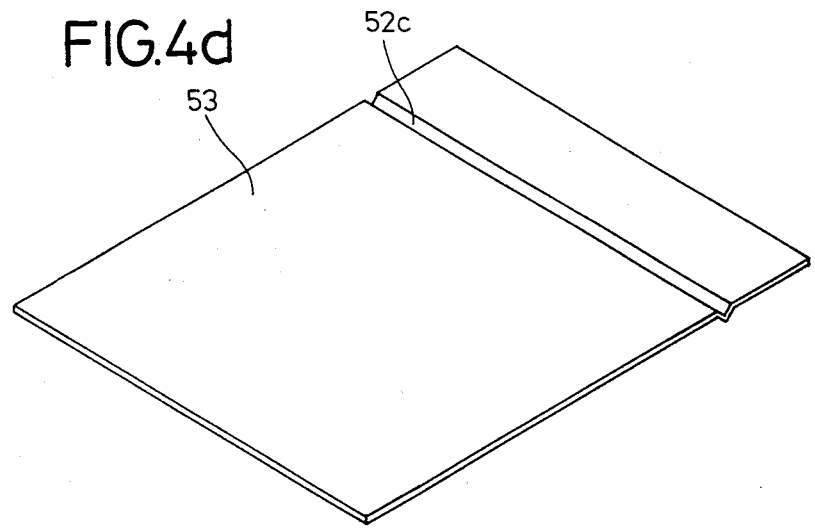

The lower portion 36 includes a wall 46 on the leading end thereof, the wall 46 having on its inner surface sawtooth-like steps 48. A grip 50 is fixed to the trailing end of the lower portion 36 which confronts the wall 46. The inner surface of the bottom wall of the lower portion 36 has a recess 52 (see FIG. 4a) defined therein as a vent means near the steps 48 on the wall 46. Instead of the recess 52, a cardboard sheet 53 having holes 52a smaller in diameter than a suction disk of a suction mechanism (described below) may be disposed on the bottom wall of the lower portion 36, as shown in FIG. 4b. Alternatively, a cardboard sheet 53 having a slit 52b defined therein may be disposed on the bottom wall of the lower portion 36, as shown in FIG. 4c, or a cardboard sheet 53 having a triangular groove 52c defined therein may be disposed on the bottom wall of the lower portion 36, as shown in FIG. 4d. The bottom wall of the lower portion 36 should preferably have a plurality of parallel ribs 51 on the outer surface thereof for stiffening the tray 32 to give the tray 32 a desired degree of mechanical strength.

The cover member 34 is peelably secured to the tray 32 by an adhesive or the like. The cover member 34 is of a length which is more than twice the length of the tray 32 in the direction in which the tray 32 is loaded. The film access opening 40 is fully closed by a portion of the cover member 34, which has its remaining portion folded back on itself at a substantially central position on the leading surface portion 42 and extending outwardly beyond the trailing end of the lower portion 36.

A loading device for loading the sheet film package 30 thus constructed will be described below.

Figure 6:
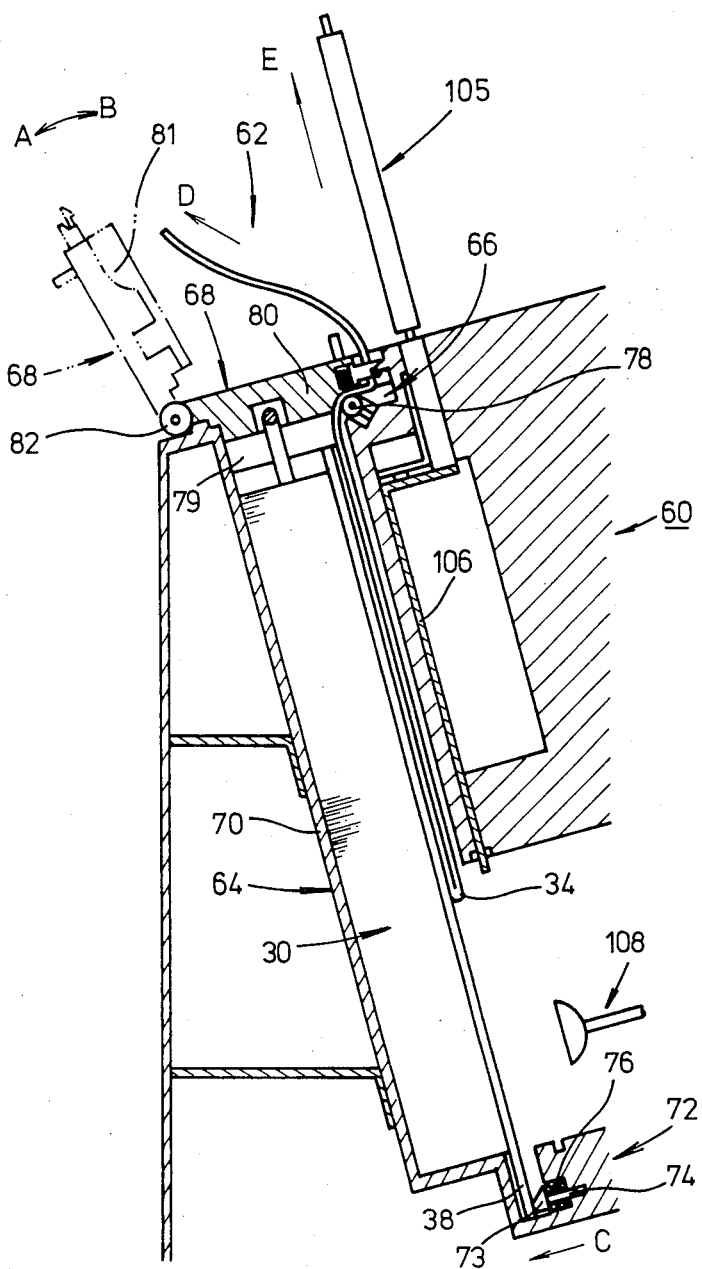
FIG. 6 is a vertical cross-sectional view showing the manner in which the sheet film package is loaded into the loading device of FIG. 5.

As shown in FIGS. 5 and 6, a loading device generally denoted at 60 may be in the form of an image recording device and has a package loading mechanism 62. The package loading mechanism 62 includes a package receiver 64, a roller unit 66, and a loading slot opening and closing unit 68. The package receiver 64 is composed of a receiver base 70 inclined at an angle to the vertical direction and bent in complementary relation to the package 30.

In FIG. 6, a stopper member 72 is disposed at the lower end of the receiver base 70 for pressing and fixing the upper portion 38 of the package 30 in position. The stopper member 72 comprises a trapezoidal locking member 73 and a rod 74 integral therewith, with a coil spring 76 disposed around the rod 74. The roller unit 66 comprises a roller 78 disposed in a package loading slot 79 and rotatable supported in the image recording device 60. The loading slot opening and closing unit 68 has a curved recess 81 opening toward the roller 78. When the roller 78 is pressed into the recess 81, the roller 78 grips the cover member 34 of the package 30 inserted in the package receiver 64 and prevents extraneous light from entering the image recording device 60.

Figure 7:
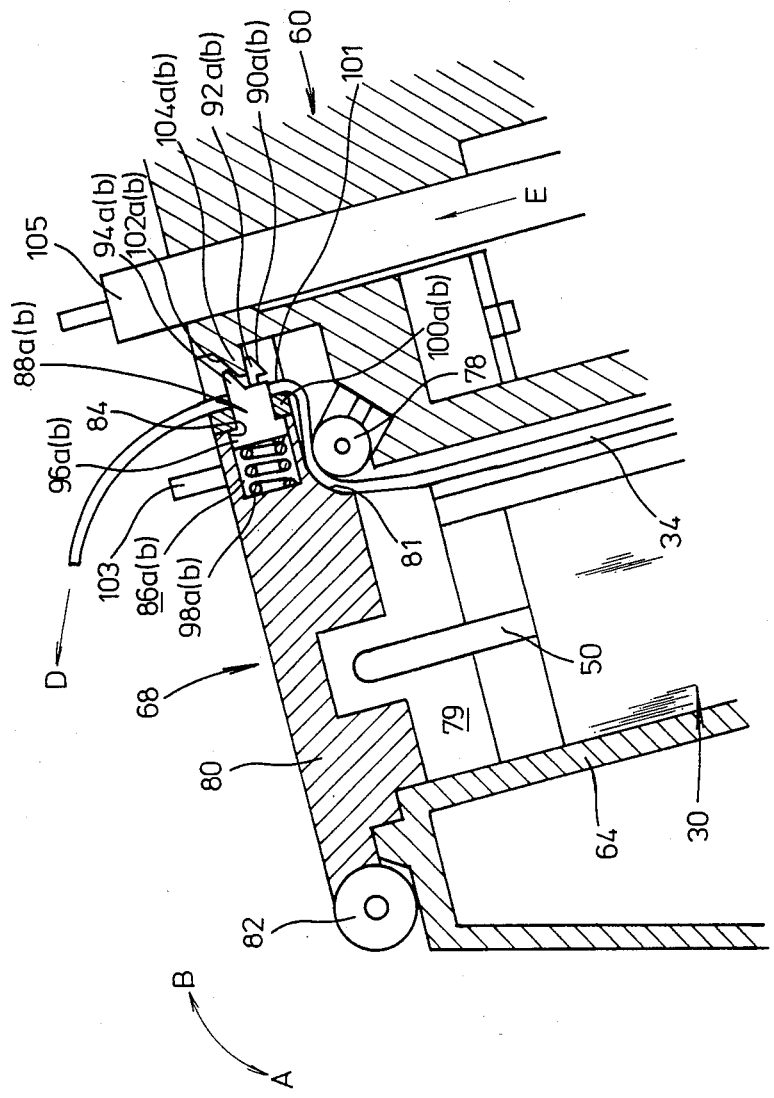
FIG. 7 is an enlarged fragmentary vertical cross-sectional view of the sheet film package and the loading device.

The loading slot opening and closing unit 68 comprises an openable closure member 80 having a recess for receiving the grip 50 of the package 30 and pivotally mounted at one end on the image recording device 60 through a support bar 82. As shown in FIG. 7, the openable closure member 80 has a surface 84 with holes 86a, 86b defined therein at opposite ends thereof, and locking members 88a, 88b are fitted respectively in the holes 86a, 86b. The locking members 88a, 88b include engaging portions 92a, 92b having slanted surfaces 90a, 90b, respectively, and pressing portions 94a, 94b, respectively. The pressing portions 94a, 94b have respective flanges 96a, 96b on one ends thereof. Coil springs 98a, 98b are disposed respectively in the holes 86a, 86b. The locking members 88a, 88b fitted in the holes 86a, 86b are retained in the openable closure member 80 by means of plates 100a, 100b fastened to the surface 84 thereof.

The image recording device 60 and the plates 100a, 100b jointly define a groove 101 therebetween for passage therethrough of the cover member 34. The plates 100a, 100b should preferably be dimensionally selected to meet the width and thickness of the cover member 34. The openable closure member 80 has a grip 103 thereon.

The image recording device 60 has engaging portions 104a, 104b having slanted surfaces 102a, 102b for engaging the engaging portions 92a, 92b of the locking members 88a, 88b, respectively. As shown in FIG. 6, the image recording device 60 also has a shutter member 105 therein and a bent thin-plate shutter 106 mounted on the lower distal end of the shutter member 105. A suction mechanism 108 such as a suction disk and a delivery mechanism (not shown) are disposed in the image recording device 60 for attracting and delivering a sheet film F to an image recorder.

Operation and advantages of the sheet film package and the loading device therefor will be described below.

A process of loading the package 30 into the packaging loading mechanism 62 will first be described. First, the openable closure member 80 is angularly moved to open the loading slot 79. More specifically, as shown in FIG. 5, the pressing portions 94a, 94b of the locking members 88a, 88b on the opposite sides of the openable closure member 80 are pushed into the holes 86a, 86b by fingers of the operator, whereupon the engaging portions 92a, 92b are brought out of engagement with the engaging portions 104a, 104b. The loading slot 79 is then opened by turning the openable closure member 80 in the direction of the arrow A with the grip 103.

The package 30 is held by the operator and inserted through the loading slot 79 into the package receiver 64. At this time, the distal end of the surface portion 42 of the upper portion 38 of the package 30 displaces the locking member 73 in the direction of the arrow C against the resiliency of the coil spring 76. When the package 30 is fully accommodated on the receiver base 70, the stopper member 72 presses the surface portion 42 under the resilient forces of the coil spring 76.

As the package 30 is placed on the receiver base 70, the cover member 34 of the package 30 is gripped between the loading slot opening and closing unit 68 and the roller 78. The end of the cover member 34 is pressed by the roller 78 against the openable closure member 80 to place the cover member 34 in a light-shielded condition.

On continued angular movement of the openable closure member 80 in the direction of the arrow B, the slanted surfaces 90a, 90b of the engaging portions 92a, 92b abut against the slanted surfaces 102a, 102b of the engaging portions 104a, 104b, causing the locking members 88a, 88b to be inserted back into the holes 86a, 86b, respectively, against the resiliency of the coil springs 98a, 98b. When the engaging portions 92a, 92b are released from the engaging portions 104a, 104b, the engaging portions 92a, 92b are moved in a direction away from the holes 86a, 86b under the bias of the coil springs 98a, 98b. As a result, the openable closure member 80 is locked by the loading device 60, closing the loading slot 79. At this time, the distal end of the cover member 34 extends out of the device 60 through the groove 101.

The distal end of the cover member 34 is now gripped and manually pulled in the direction of the arrow D until the cover member 34 as it is gripped by the roller 78 is peeled off the upper portion 38 of the tray 32. Since the distal end of the surface portion 42 of the upper tray portion 38 is pressed by the stopper member 72 at this time, the tray 32 is prevented from moving while the cover member 34 is being peeled off the tray 32. Therefore, the cover member 34 is efficiently peeled off the tray 32.

After the cover member 34 has been peeled off the upper portion 38 over a prescribed length, the shutter member 105 is pulled out in the direction of the arrow E to displace the shutter 106 in the same direction. The film access opening 40 of the tray 32 is now opened into the image recording device 60.

Then, the suction mechanism 108 is actuated to feed sheet films F successively from the tray 32 to the non-illustrated delivery mechanism. Desired images are thereafter recorded on the sheet films F by a laser beam or the like. The sheet films F in the tray 32 are effectively prevented by the engaging portion 44 from dropping into the device 60.

Upon removal of all of the sheet films F from the tray 32, the suction mechanism 103 engages the vent means, or the recess 52, on the bottom wall of the tray 32, and air flows through the recess 52 into the suction mechanism 108. Stated otherwise, there is no longer any sheet film F to be picked up from the tray 32, and the vacuum in the suction mechanism 108 is varied by the air flowing in through the recess 52, thus detecting that no sheet film is left in the tray 32. The same detecting process can be achieved with the cardboard sheets shown in FIGS. 4b, 4c, and 4d. The suction mechanism 108 is now inactivated, and the openable closure member 80 is turned in the direction of the arrow A to allow the empty package 30 to be taken from the package loading mechanism 62. If necessary, a new package 30 with a stack of sheet films F stored therein is thereafter placed into the package loading mechanism 62, and the sheet films F will successively be deliverd to the image recorder in the same manner as described above.

In this embodiment, the sheet film package 30 is directly loaced into the package loading mechanism 62 to permit the sheet films F to be delivered into the image recording device 60. Thus, it is not required to employ any conventional dedicated magazine. Sheet films F can be loaded into the device 60 simply by inserting the package 30, which is relatively lightweight, into the package loading mechanism 62. The process of loading sheet films F is essentially composed of the steps of opening the openable closure member 80, inserting the package 30, and peeling the cover member 34 off the package 30. Consequently, the sheet films F can be loaded highly efficiently without relying upon the conventional complex loading process.

Because the cover member 34 of the tray 32 is pressed against the openable closure member 30 by the roller 78, the cover member 34 can smoothly be peeled off and the sheet films F in the package 30 are prevented from exposure to extraneous light.

Figure 8:
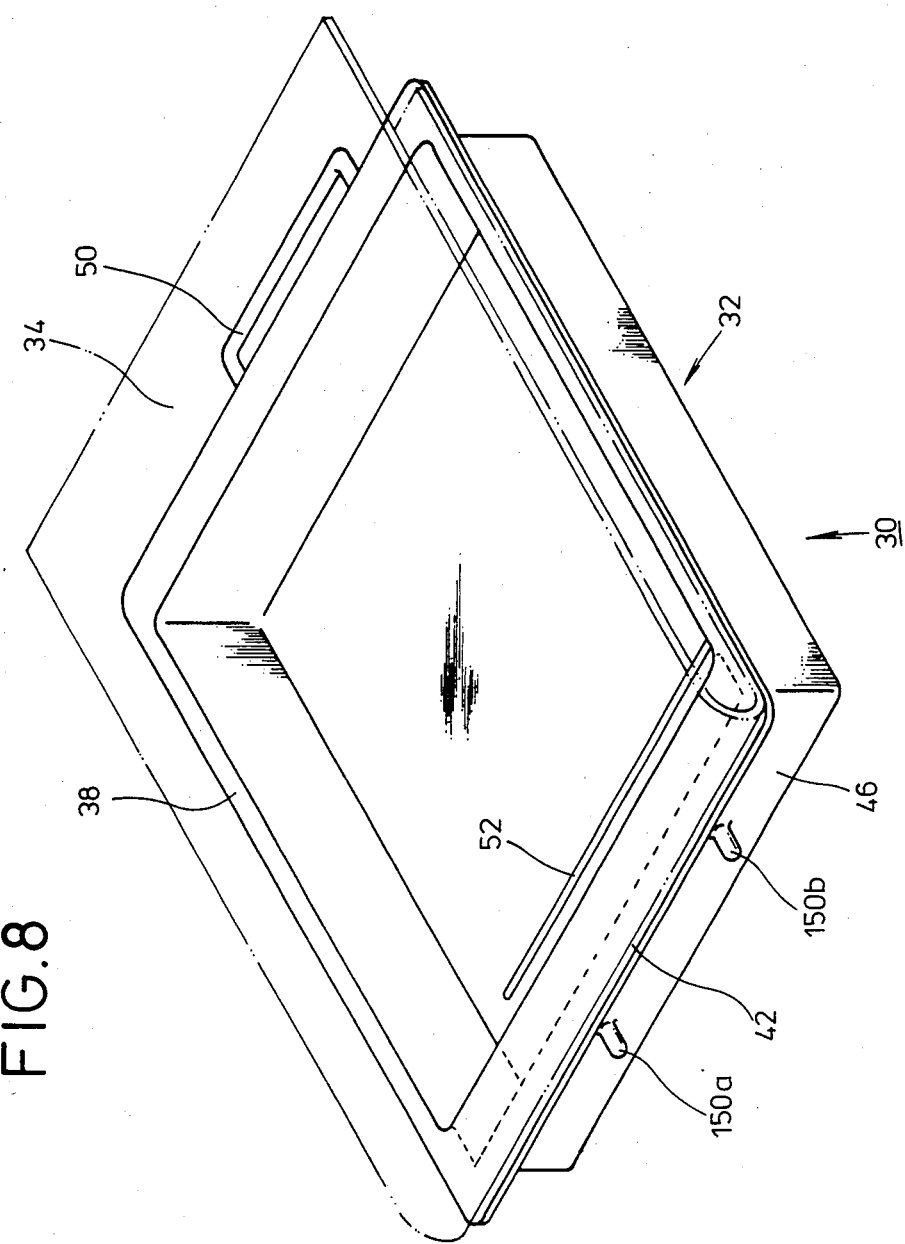
FIG. 8 is a perspective view, partly omitted from illustration, of a sheet film package according to another embodiment of the present invention.

FIGS. 8 and 9 show a sheet film package according to another embodiment of the present invention. In this embodiment, two spaced pins or projecting portions 150a, 150b project from the leading wall 46 of the tray 32. In FIG. 9, the height of the pins 150a, 150b is selected such that a plane interconnecting the distal ends of the pins 150a, 150b and the distal end of the surface portion 42 extends perpendicularly to the bottom wall of the tray 32.

A loading device for loading the sheet film package of FIGS. 8 and 9 is not required to have the stopper member 72 of the preceding embodiment as shown in FIG. 6. As can be seen from FIG. 10, the package loading mechainsm includes a cover 152 openably mounted at one end on a device housing 156 by means of a support pin 154, with a roller 158 mounted on the other end of the cover 152. The roller 158 is displaceable under the resilient forces of a coil spring (not shown). The cover 152 has a lower receiver base 160a and an upper receiver base 160b for jointly supporting the package 30 thereon. The lower receiver base 106a having holes 162a, 162b in which the pins 150a, 150b of the package 30 can be fitted. The housing 156 accommodates a shutter member 105 therein that can open and close a chamber defined in the housing 156 and in which the suction mechanism 108 is disposed.

As shown in FIG. 11, the cover 152 is swung in the direction of the arrow A to open the package loading mechanism 62, and the package 30 is placed on the cover 152. More specifically, the pins 150a, 150b are fitted respectively into the holes 162a, 162b of the lower receiver base 160a, and the package 30 is disposed on the lower and upper receiver bases 160a, 160b. Then, the cover 152 is turned in the direction of the arrow B to close the package loading mechanism 62. At this time, the cover 152 may be locked on the housing 156 by the same lock mechanism as described with reference to FIG. 7. As illustrated in FIG. 10, when the cover 152 is fastened to the housing 156, the cover member 34 of the package 30 is gripped between the roller 158 and an engaging surface 166 of the housing 156, and the distal end of the cocver member 34 extends outwardly through a gap or groove 168 defined between the cover 152 and the housing 156.

The distal end of the cover member 34 is now gripped and pulled out in the direction of the arrow E (FIG. 10), so that the cover member 34 is peeled off the surface portion 42 of the upper portion 38 of the tray 32 over a prescribed length while being gripped in a lightshielded condition by the roller 158 and the engaging surface 166. The shutter member 105 is then pulled in the direction of the arrow E to open the film access opening 40 into the housing 156. The suction mechanism 108 is operated to deliver the sheet films F successively from the package 30 to an image recorder (not shown).

In the embodiment shown in FIGS. 8 through 11, the pins 150a, 150b project from the leading wall of the tray 32, and the lower receiver base 160a of the package loading mechanism 62 has the respective holes 162a, 162b for receiving the pins 150a, 150b, respectively. Therefore, the package 30 is securely positioned in the package loading mechanism 62 for allowing the cover member 34 to be peeled off smoothly and reliably. That is, when the cover member 34 is pulled in the direction of the arrow E in FIG. 10, the leading end of the package 30 tends to rise in the direction of the arrow G since the cover member 34 is bonded to that end of the package 30 by an adhesive or the like. Since the pins 150a, 150b of the tray 32 are snugly fitted in the respectively holes 162a, 162b of the lower receiver base 160a, the tray 32 is firmly secured to the cover 152 against any unwanted displacement. The pins 150a, 150b and the surface portion 42 project outwardly by substantially the same length. With this arrangement, the package 30 can be positioned in an erected condition with the pins 150a, 150b and the distal end of the surface portion 42 being directed downwardly and the grip 50 being oriented upwardly. Accordingly, many packages 30 can be placed on a small support table, and can be conveyed highly efficiently while they are being stored in erected positions.

Figure 12:
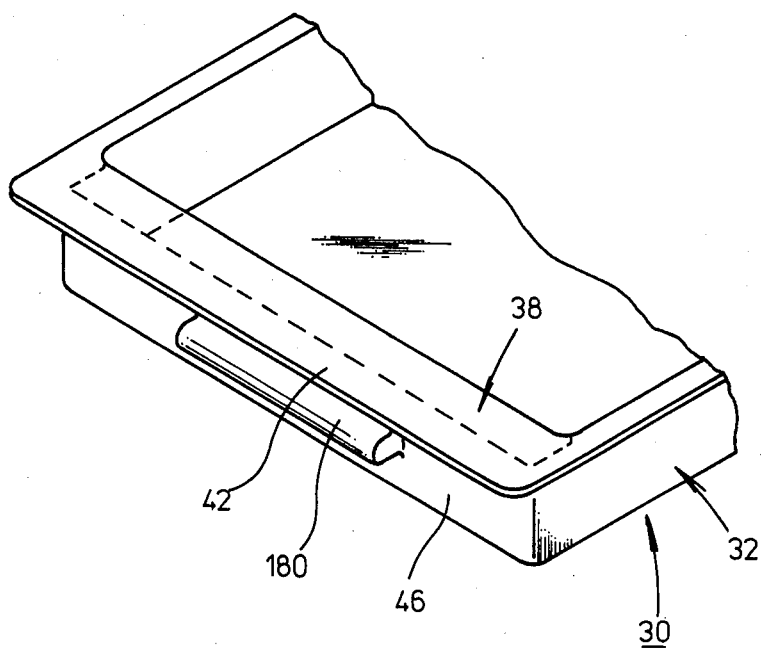
FIG. 12 is a fragmentary perspective view, partly omitted from illustration, of a sheet film package according to still another embodiment of the present invention.

While the two pins 150a, 150b are disposed on the tray 32, a single ridge 180 (FIG. 12) may be formed on the leading wall 46 of the tray 30, the ridge 180 being of a prescribed width and having a distal end lying in the plane in which the distal end of the surface portion 42 lies. The cover 152 of the package loading mechanism 62 may have a groove, instead of the holes 162a, 162b (FIG. 10), for receiving the ridge 180 therein to retain the package 30 in position.

Figure 13:
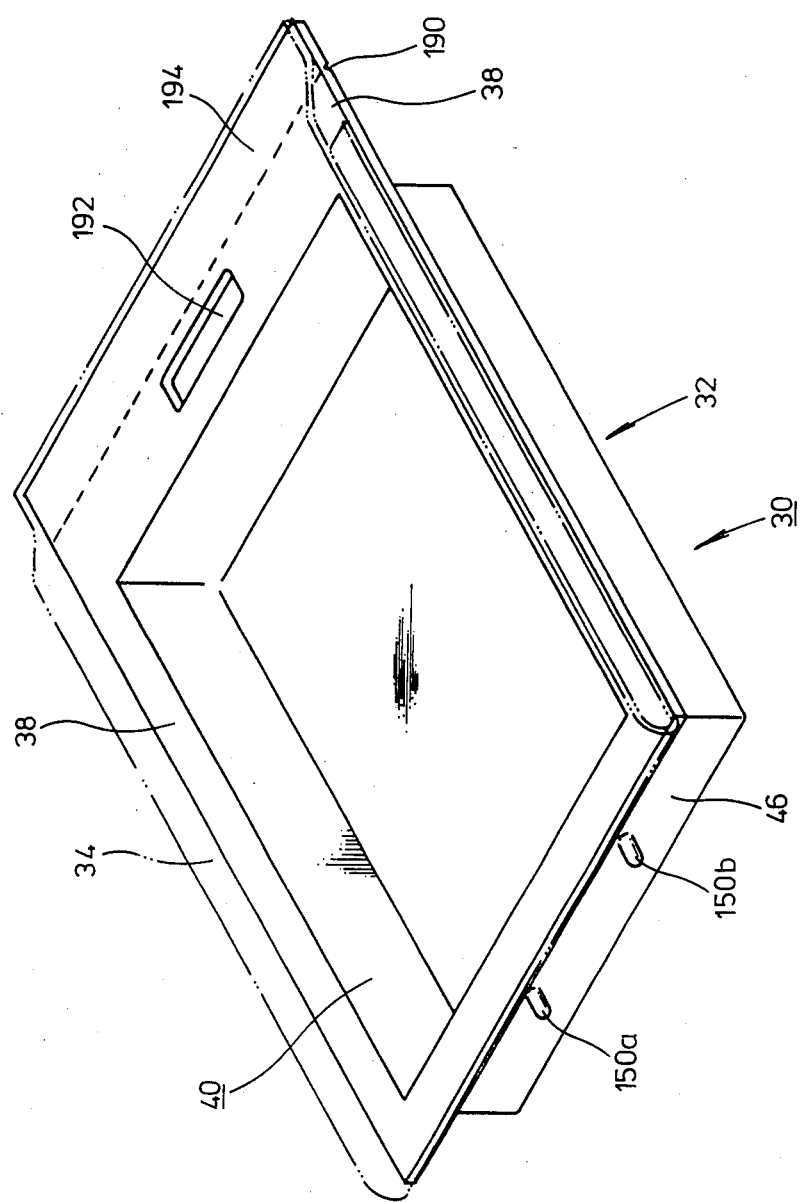
FIG. 13 is a perspective view, partly omitted from illustration, of a sheet film package according to a still further embodiment of the present invention.
Figure 14:
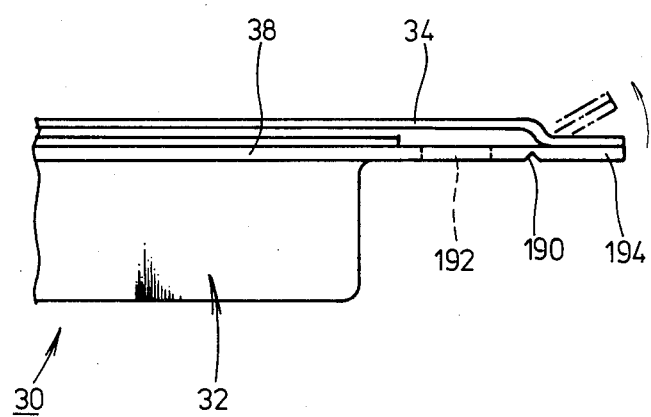
FIG. 14 is a fragmentary side elevational view of the sheet film package of FIG. 13.
Figure 15:
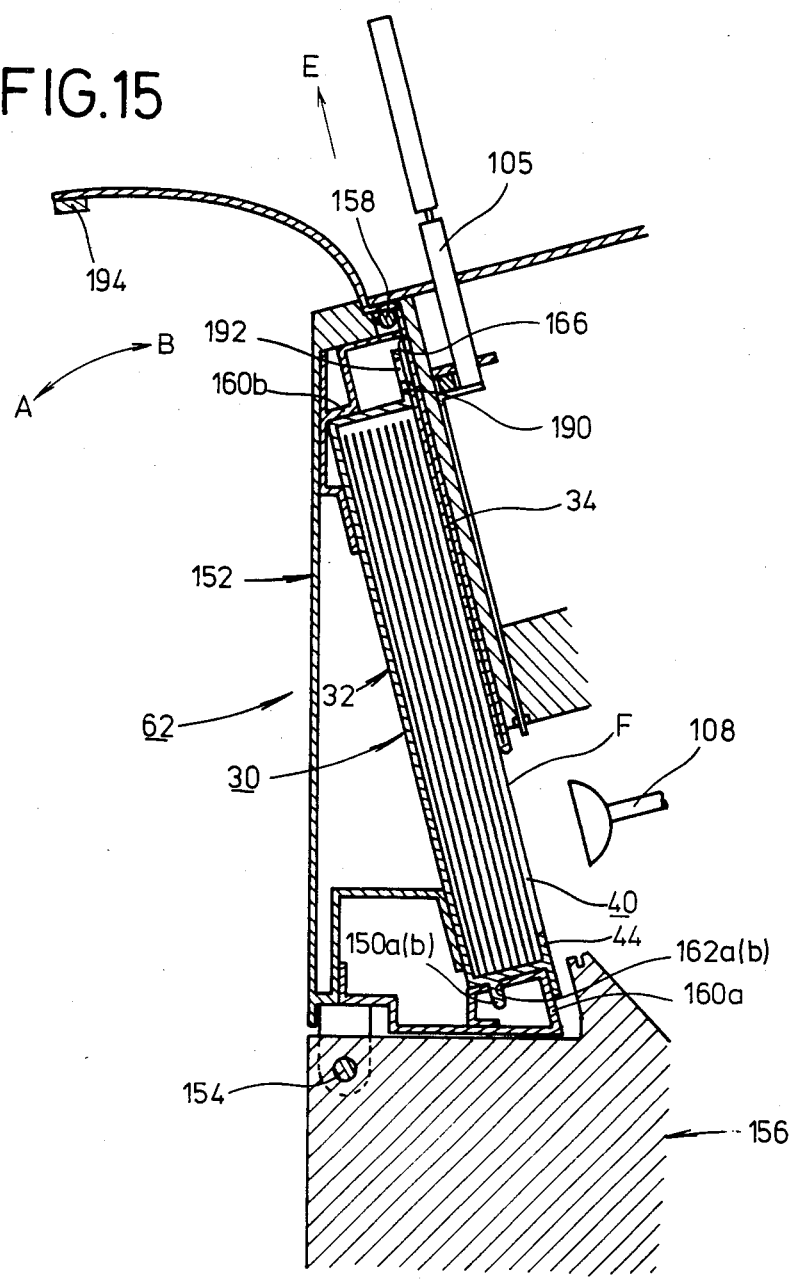
FIG. 15 is a fragmentary vertical cross-sectional view of the sheet film package of FIGS. 13 and 14 and a loading device therefore.

FIGS. 13 through 15 illustrate a sheet film package according to still another embodiment of the present invention. The upper portion 38 of the tray 32 has an elongate recess 190 defined in the back of the marginal edge thereof, and a rectangular slot 192 extending along the recess 190. The marginal edge of the upper portion 38 thus has a joined portion 194 that can be broken off the rest of the upper portion 38. The distal end of the cover member 34 after it has been folded back on itself is securely attached to the joined portion 194.

The package 30 shown in FIGS. 13 and 14 is loaded into the package loading mechanism as illustrated in FIG. 15. When the cover 152 is fixed to the housing 156, as shown in FIG. 15, the cover member 34 is gripped between the roller 158 and the engaging surface 166 of the housing 156, and the distal end of the cover member 34 extends outwardly through the gap 168 between the cover 152 and the housing 156. The joined portion 194 has previously been detached from the tray 32 and attached to the distal end of the cover member 34 so that it can easily be gripped. The end of the cover member 34 and the attached joined portion 194 are pulled together to open the film access opening 60. The joined portion 194 is formed of a hard resin material to enable the operator to pull the cover member 34 with a more uniform force than would if only the end of the flexible cover member 34 were pulled. As a result, the cover member 34 is reliably be peeled off the tray 32 for opening the film access opening 40. Since the slot 192 is defined in the upper portion 38 of the tray 32, the operator can easily grip and carry the package 30 by inserting a finger or fingers in the slot 192.

Figure 16:
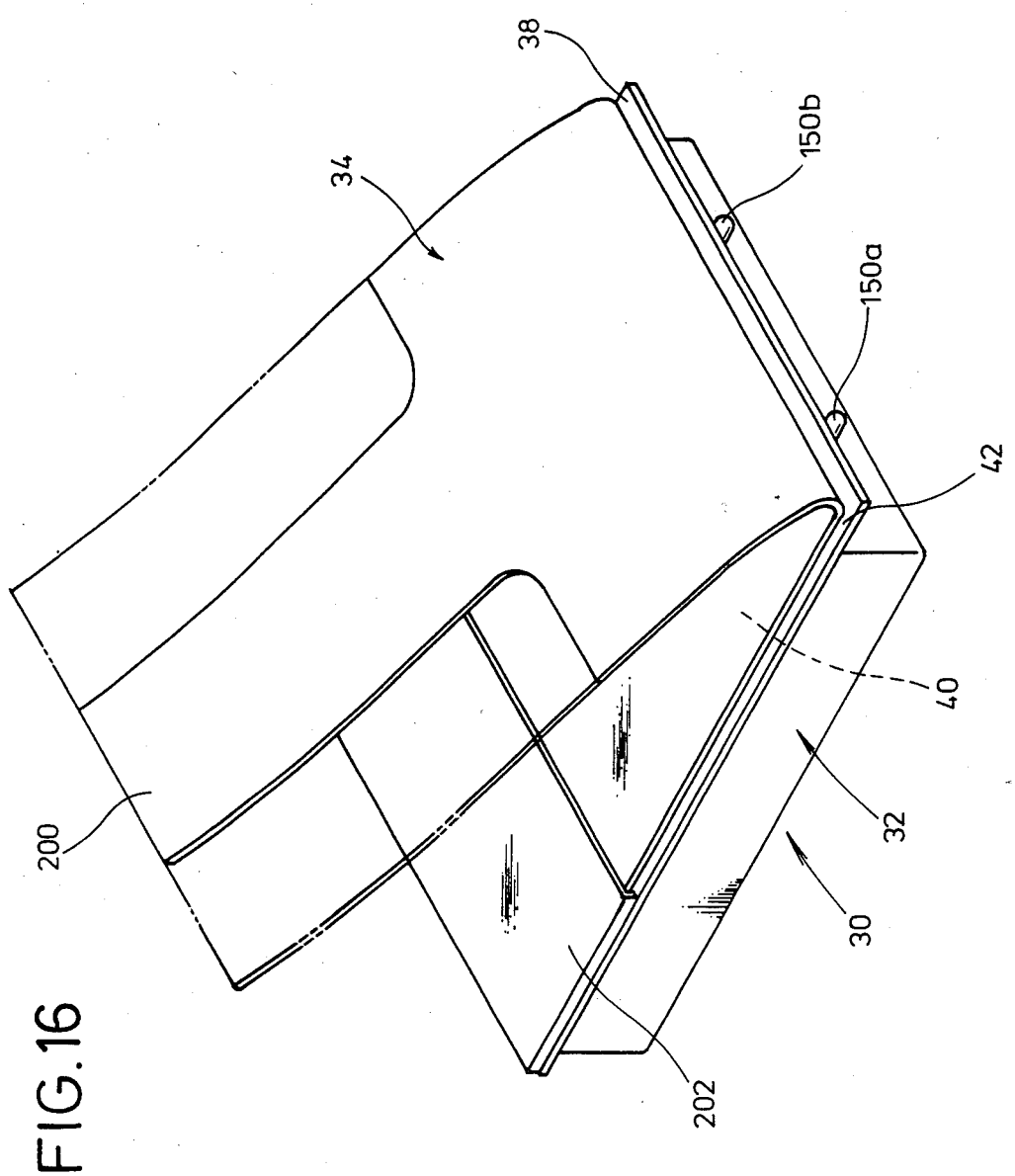
FIG. 16 is a perspective view of a sheet film package according to yet still another embodiment of the present invention.

According to a still further embodiment shown in FIG. 16, the flexible cover member 34 is peelably bonded to the upper portion 38 of the tray 32, and the film access opening 40 is completely closed by a portion of the cover member 34. The cover member 34 has on an end portion thereof a grip tongue 200 of a reduced width which is defined by cutting off opposite side portions of the cover member 34. A hard guide member 202 is firmly fixed to the rear or trailing end of the tray 32 in covering relation to a portion of the cover member 34. The guide member 202 is positioned such that when the cover member 34 is peeled off the tray 32, the cover member 34 abuts against the guide member 202 to sufficiently open the film access opening 40.

The package 30 thus constructed is loaded into the package loading mechanism 62 as shown in FIG. 10. After the package 30 has been loaded in position, the grip tongue 200 is pulled by the operator to open the film access opening 40. As the cover member 34 is peeled off the tray 32, the cover member 34 engages the guide member 202, permitting the operator to confirm that the film access opening 40 has been opened in the device. The process of loading the package is now completed.

Since the cover member 34 is not completely peeled off the tray 32 in this embodiment, a more reliable light-shielded condition can be provided between the device housing and the cover member 34. The narrower grip tongue 200 on one end of the cover member 34 allows the operator to peel off the cover member 34 easily by gripping the grip tongue 200. Thus, the cover mebmer 34 can easily be handled during the peeling operation.

Figure 17:
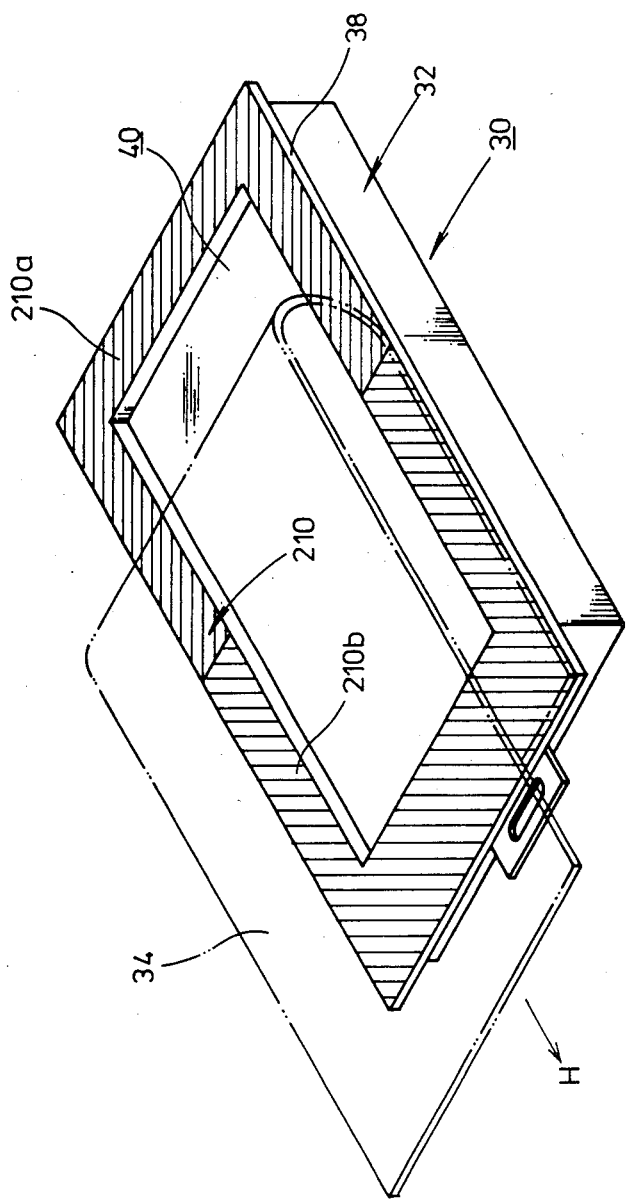
FIG. 17 is a perspective view, partly omitted from illustration, of a sheet film package according to a yet still further embodiment of the present invention.

In FIG. 17 which shows yet another embodiment of the present invention, an adhesive area 210 between the upper portion 38 and the cover member 34 of the tray 32 comprises a first adhesive layer 210a having a weaker bonding strength which allows the cover member 34 to be peeled off more easily and a second adhesive layer 210b having a stronger bonding strength which enables the cover member 34 to be bonded more firmly. The tray 32 of FIG. 17 has no guide member 202.

After the package 30 has been loaded in the package loading mechanism 62, the cover member 34 is pulled in the direction of the arrow H. The cover member 34 is first peeled off along the first adhesive layer 210a until finally the cover member 34 is prevented by the second adhesive alyer 210b from being peeled off. As a consequence, the film access opening 40 is opened into the package loading mechanism 62. the first adhesive layer 210a allows the cover member 34 to be easily peeled off for opening the film access opening 40. When the cover member 34 is peeled off up to the second adhesive layer 210b, it then becomes difficult to peel off the cover member 34 on account of the second adhesive layer 210b. The film access opening is therefore opened to the desired range defined by the first adhesive layer 210a, and a desired light-shielding effect is obtained by the cover member 34.

Figure 18:
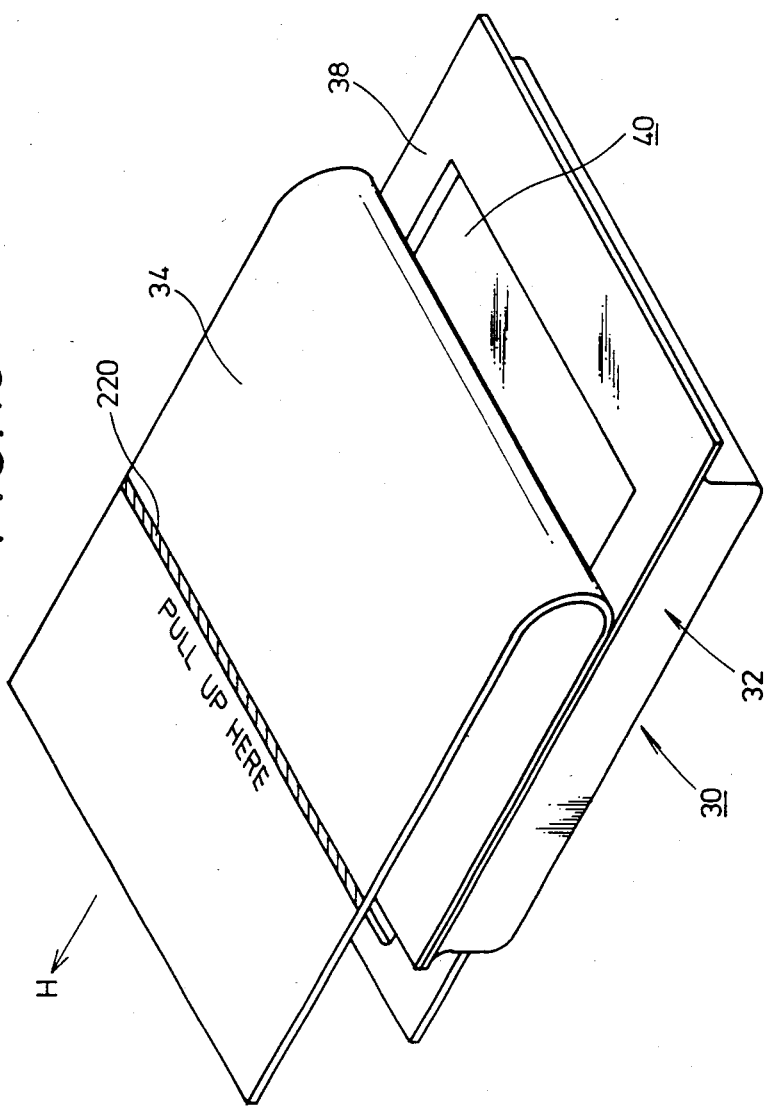
FIG. 18 is a perspective view of a sheet film package according to another embodiment of the present invention.

FIG. 18 illustrates a yet still further embodiment of the present invention. In this embodiment, the cover member 34 of the package 30, which may be of the arrangement as shown in FIG. 17, has marks or indicia 200 on its back, indicating "PULL OUT UP TO THIS POINT" or the like. after the package 30 has been loaded in the package loading mechanism 62, the projecting end of the cover member 34 is gripped and pulled until the indicia 220 are exposed out of the package loading mechanism 62, whereupon the operator can confirm that the film access opening 40 is now sufficiently opened and no further pulling of the cover member 34 is necessary.

Figure 19:
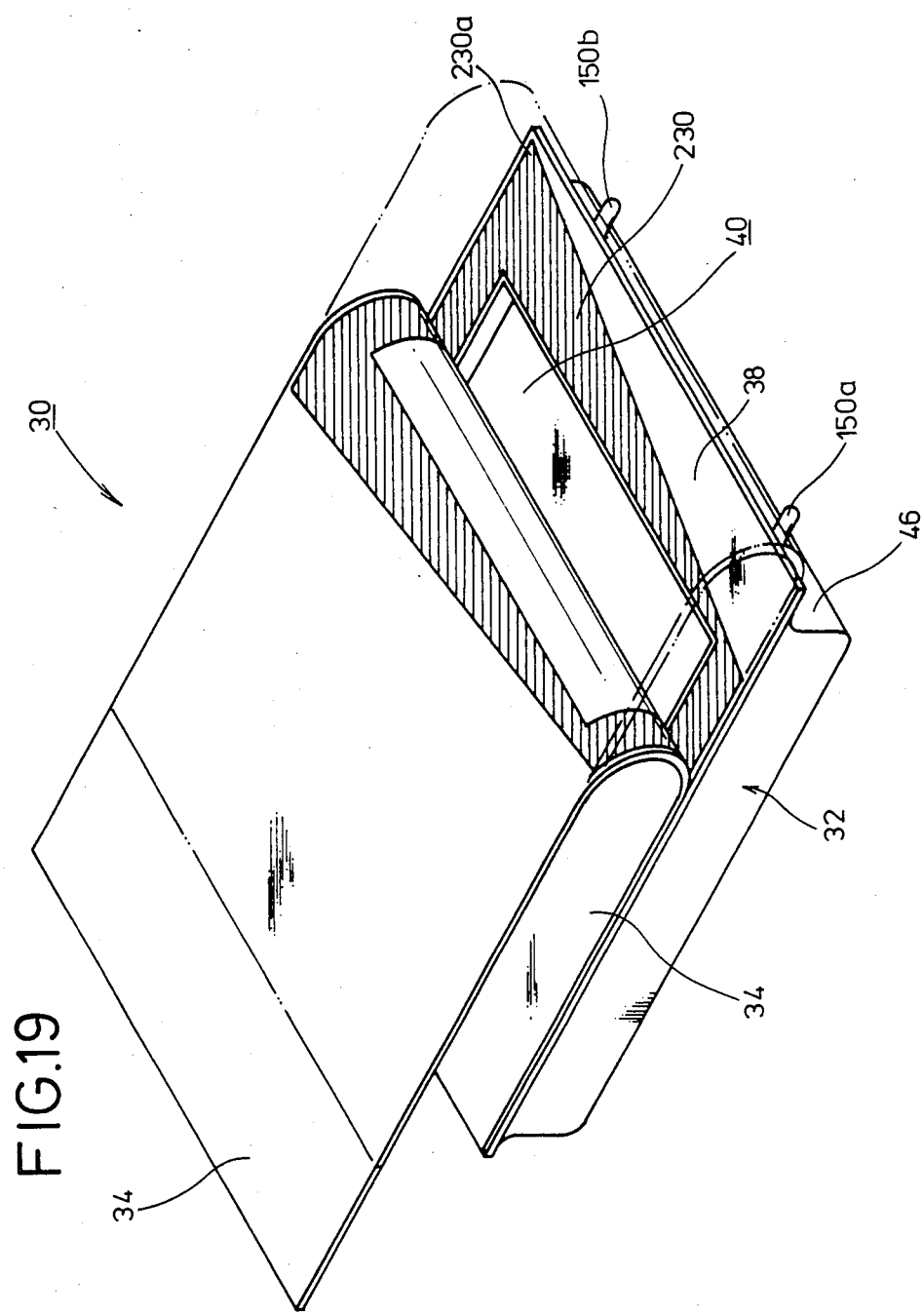
FIG. 19 is a perspective view of a sheet film package according to still another embodiment of the present invention.

In another embodiment shown in FIG. 19, an adhesive layer 230 is applied, as indicated by a shaded area, to the upper portion 38 for bonding the cover member 34 to the tray 32 in a light-shielding condition. On the marginal edge portion of the upper portion 38, the adhesive layer 230 has an edge extending obliquely to the longitudinal direction of the tray 32, so that the adhesive layer 230 is gradually reduced in width.

After the package 30 has been loaded in the package loading mechanism 62, the end of the package 30 is pulled out to peel the cover member 34 easily off the tray 32. Because the adhesive layer 230 on the marginal edge portion of the tray 32 has its edge inclined to the longitudinal direction of the tray 32, the force applied to peel off the cover member 34 is first concentrated on a point 230a on the adhesive layer 230, and thereafter the cover member 34 is progressively peeled off from one side to the other on the marginal edge portion of the upper portion 38.

When starting to peel off the cover member 34, the force is concentrated on the point 230a on the adhesive layer 230, with the consequence that the cover member 34 can be peeled off easily without requiring a large pulling force.

Figure 20:
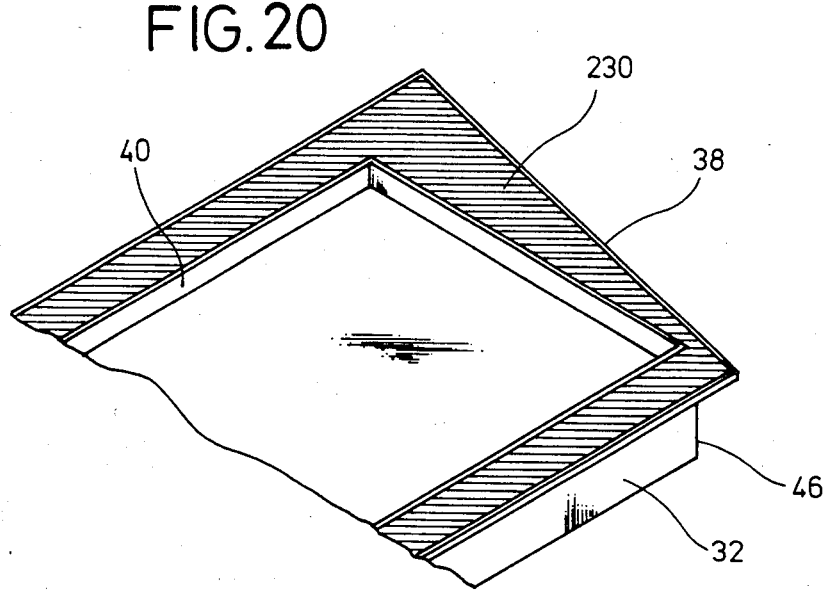
FIGS. 20 through 22 are fragmentary perspective views of sheet film packages according to other embodiments of the present invention.
Figure 21:
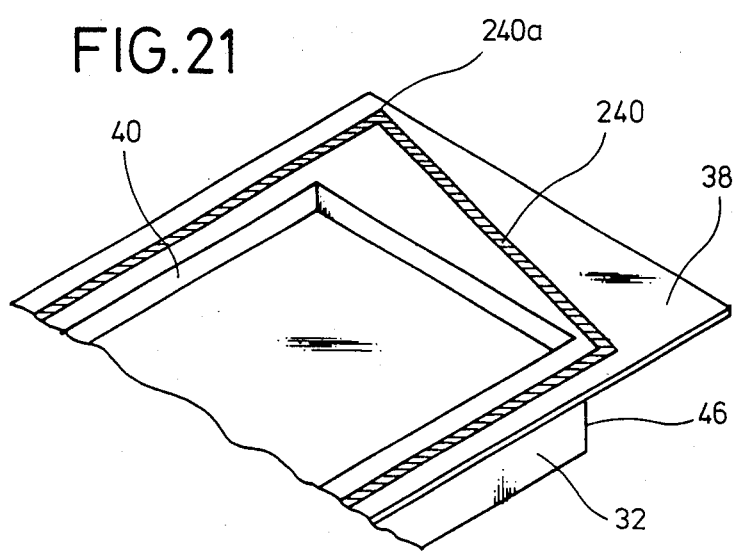

As shown in FIG. 20, the marginal edge of the tray 32 may be shaped complementary to the inclined edge of the adhesive layer 230 on the marginal edge portion of the upper portion 38. Moreover, as shown in FIG. 21, an adhesive layer 240 of a uniform width may be aaplied to the upper portion 38 and may be inclined on the marginal edge portion of the upper portion 38 to the direction in which the cover member 34 is pulled, so that the force tending to pull the cover member 34 is initially applied solely to a point 240a on the adhesive layer 240.

Figure 22:
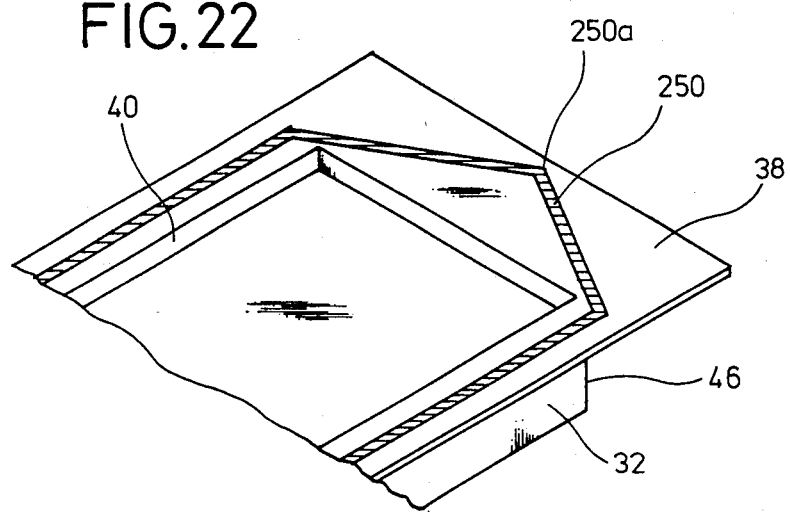

According to another embodiment of FIG. 22, an adhesive layer 250 on the marginal edge portion of the upper portion 38 extends obliquely toward opposite sides from a central point 250a. When pulling the cover member 34, it can be peeled off uniformly on opposite sides progressively from the central point 250a. The cover member 34 can uniformly be peeled off in a well-balanced manner in the longitudinal direction of the tray 32 since no unbalancing lateral forces are applied in a direction normal to the direction in which the cover member 34 is peeled off. the cover member 34 can therefore be peeled off easily, neatly, and smoothly.

FIGS. 23 through 26 show a sheet film package according to still another embodiment of the present invention. In this embodiment, a cushioning member comprising a plurality of hollow air bags made of a flexible material is disposed in a package for containing a stack of sheet films, the cushioning member serving to hold the sheet films in position. More specifically, the tray 32 has a through hole 251, and a cushioning member 252 is disposed in the tray 32. The cushioning member 252 is composed of a plurality of air bags or pouches 254a through 254d made of a flexible material and an air bag or pouch 256 made of a flexible material and positioned over the air bags 254a through 254d. The air bags 254a through 254d are interconnected by air passage members 258a through 258d.

Figure 23:
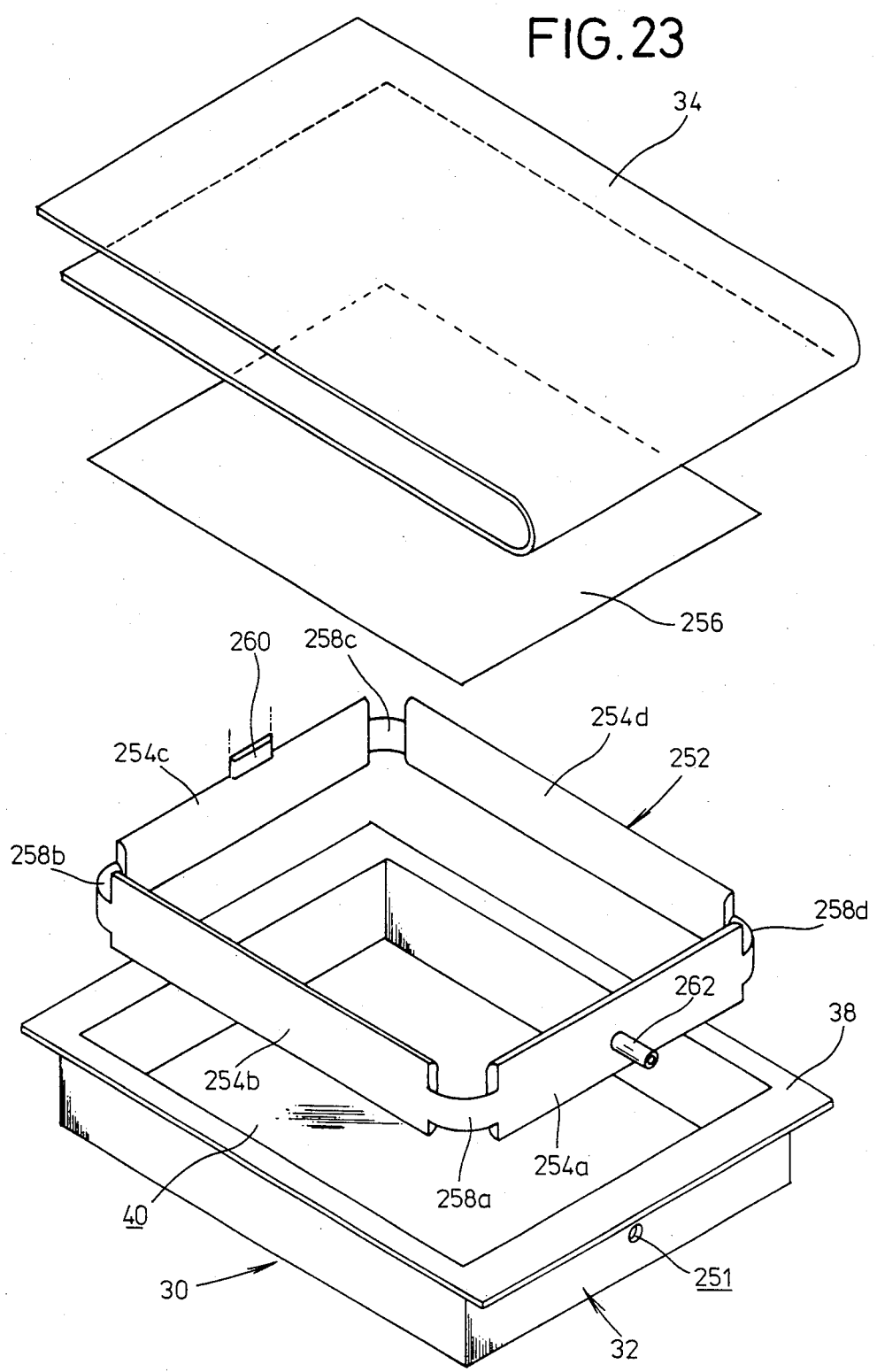
FIG. 23 is an exploded perspective view of a sheet film package according to a still further embodiment of the present invention.
Figure 24:
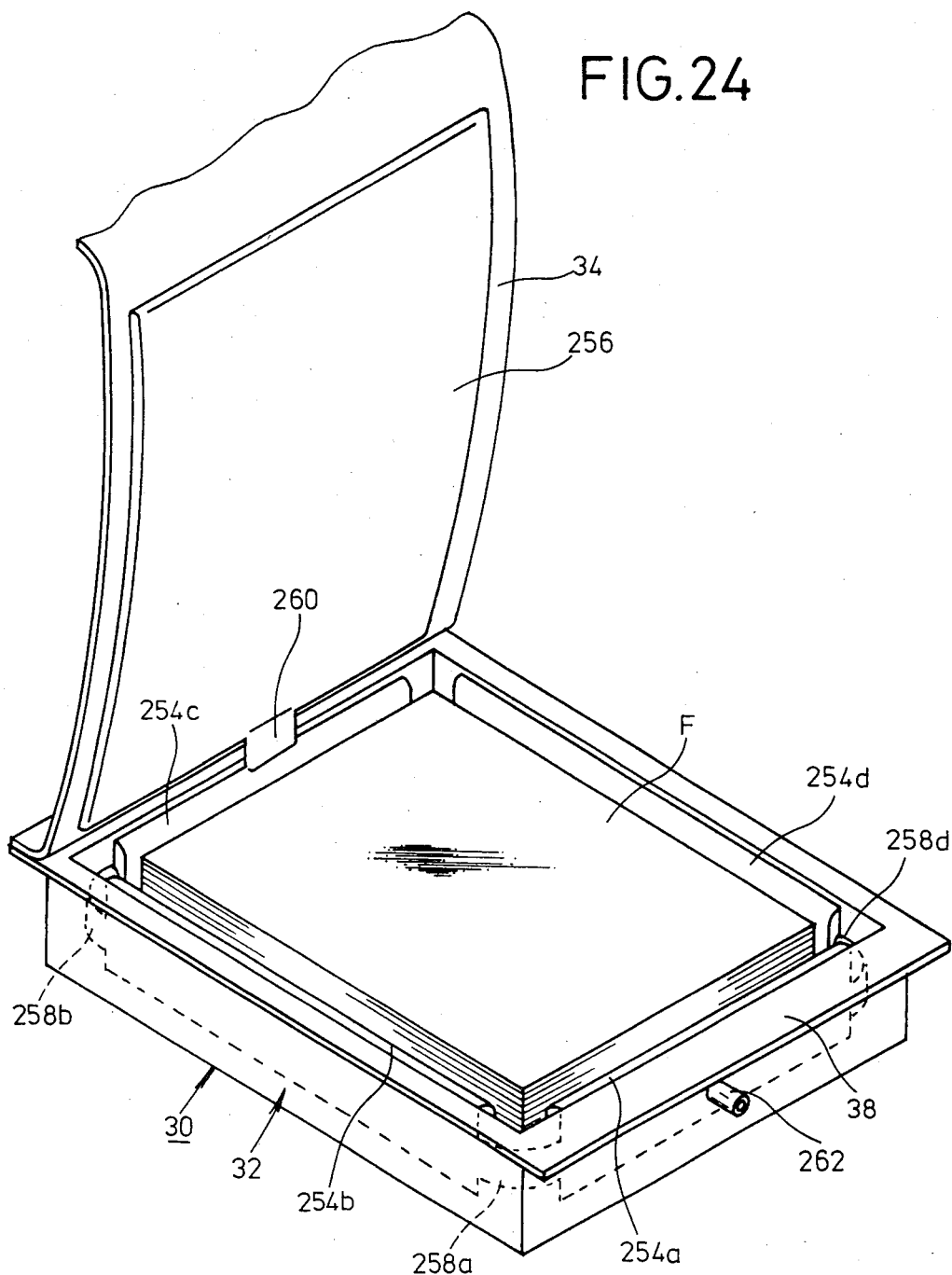
FIG. 24 is a perspetive view showing the manner in which films are stored into the sheet film package illustrated in FIG. 23.

The air bags 254a through 254d are shown as disconnected from the air bag 256 in FIG. 23, but are preferably connected to the air bag 256 via an air passage member 260 as illustrated in FIG. 24. Therefore, the air bags 254a through 254d, 256 and the air passage members 258a through 258d, 260 are integrally formed as joined hollow structures.

The air bag 254a has a substantially cylindrical air inlet 262 in which there is disposed a check valve (not shown) for preventing air from flowing out of the air bag 254a. The air bags 254a through 254d and the air passage members 258a through 258d are disposed in the tray 32, with the air inlet 262 inserted through the hole 250, as shown in FIG. 24. The air bag 256 is positioned against the inner surface of the light-shielding cover member 34.

Before sheet films F are placed in the tray 32, no air is introduced into the air bags 254a through 254d via the air inlet 262. Thereofre, when the sheet films F are placed into the tray 32, there are gaps between the air bags 254a through 254d and the sheet films F. At the time of storing the sheet films F into the tray 32, the sheet films F are not pressed against the air bags 254a through 254d, and hence can easily be stored into the film package 30. After the sheet films F have been inserted in the tray 32, the cover member 34 is peelably attached to the upper surfaces of the side walls of the tray 32 to close the package 30 in a light-shielding condition. Then, air is introduced via the air inlet 262 into the cushioning member 252. Specifically, a pump device (not shown) is connected to the air inlet 262 and operated to supply air under pressure via the air inlet 262 into the air bags 254a through 254d, 256 and the air passages 258a through 258d, 260, whereupon the air bags 254a through 254d, 256 are expanded.

Figure 25:
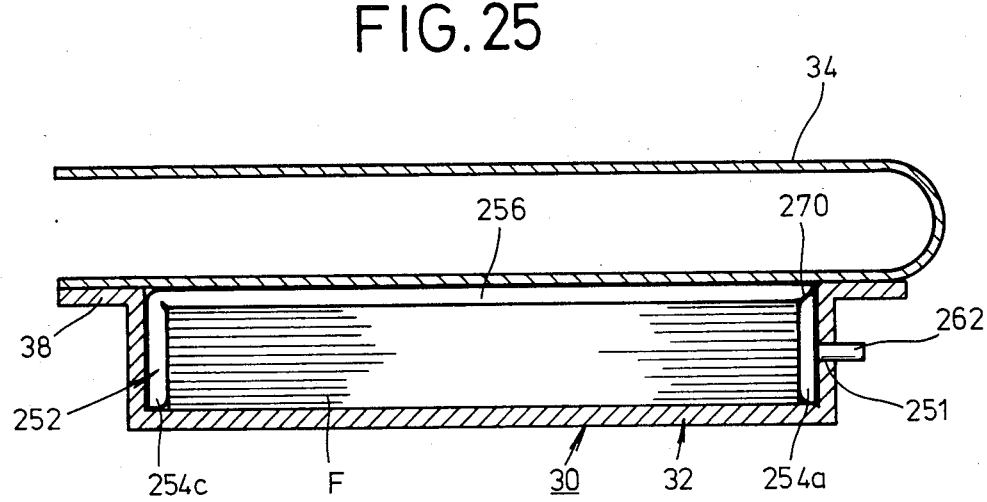
FIG. 25 is a vertical cross-sectional view of the sheet film package of FIG. 23 in which sheet films are stored.

An adhesive is applied in advance to upper edges of the air bags 254a, 254b, 254d or lower surfaces of the air bag 256 in order to bond the air bags 254a, 254b, 254d to the air bag 256. For example, as shown in FIG. 25, the air bag 254a and the air bag 256 are bonded to each other by an adhesive layer 270. By closing the air inlet 262, the stacked sheet films F are pressed by the air bags 254a through 254d expanded against the side walls of the tray 32, and also by the air bag 256 expanded against the cover member 34. As a consequence, the stored films F are held in position against the danger of displacement in the package 30 even when the package 30 will abruptly be displaced as during shipment. Since the films F are pressed and kept in position by the cushioning member 252 that is expanded under air pressure, the films F are prevented from frictionally sliding against each other when the package 30 is moved. Accordingly, no abrasive damage is caused to the films F stored in the package 30, and no static electricity is produced by the films F.

Figure 26:
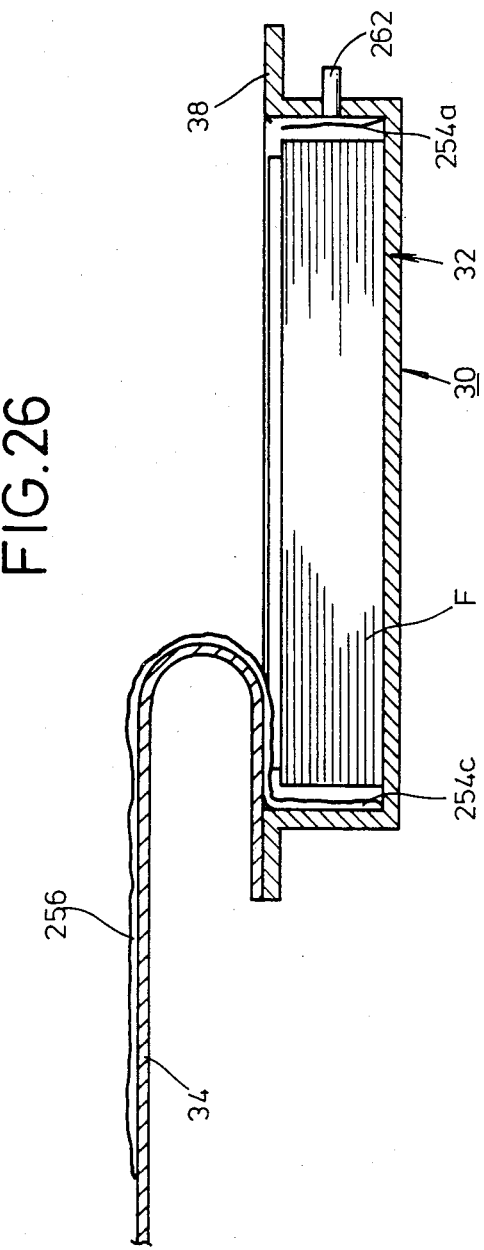
FIG. 26 is a vertical cross-sectional view of the sheet film package of FIG. 23 with a cover member peeled off.

The package 30 is loaded into the package loading mechanism 62 in the manner described above. By pulling the end of the cover member 34, the cover member 34 is peeled off while breaking the air bags 254a through 254d, 256 as shown in FIG. 26. The air under pressure in the cushioning member 252 is now discharged from the broken areas, whereupon the air bags 254a through 254d, 256 are contracted, creating gaps between the films F and the air bags 254a through 254d, 256. The films F are now released and can be picked up from the package 30.

In the embodiment of FIGS. 23 through 26, the films are prevented from rubbing against each other and hence from abrasive damage. The films can be separated easily from each other as they do not tend to stick to each other due to static electricity. Since there is no abrasive damage to the films, clear images can be recorded on the films.

As shown, the cushioning member 252 and the cover member 34 are formed separate components and thereafter attached to each other. However, the cushioning member 252 and the cover member 34 may initially be integrally formed with each other. The air bags may be replaced with spongy foamed members or flocked members.

Figure 27:
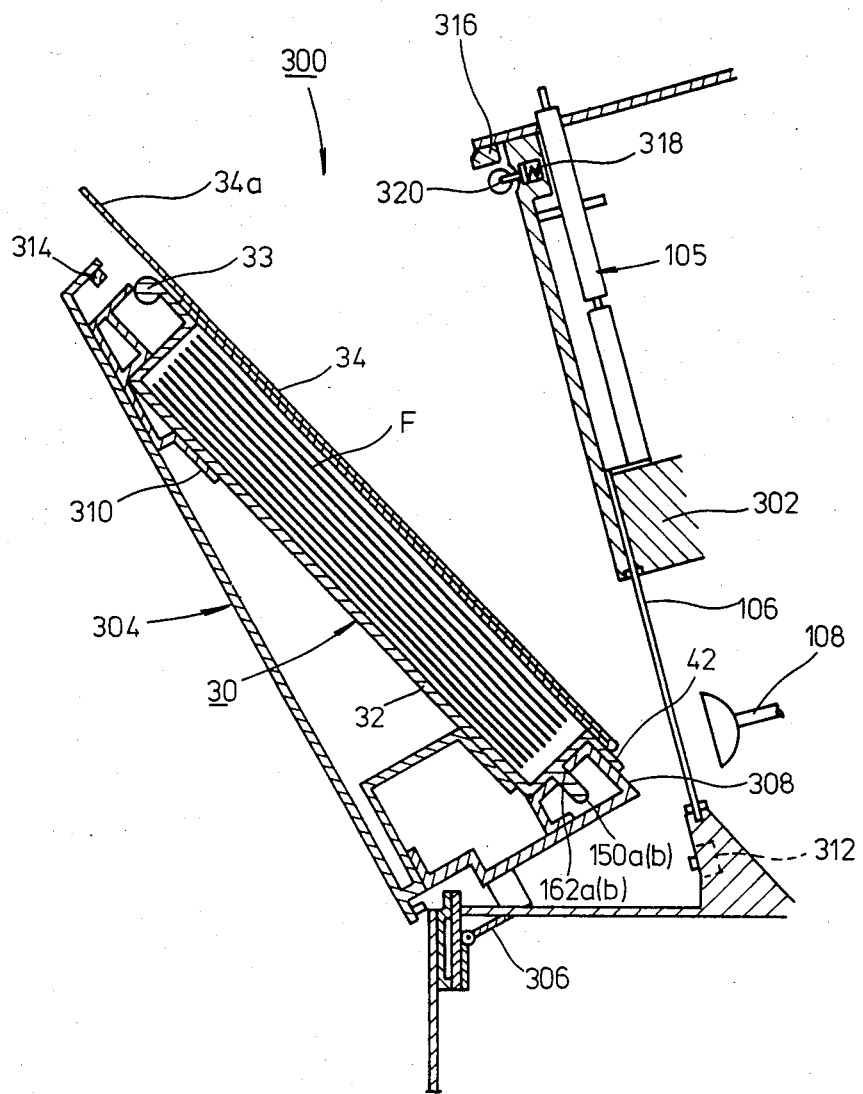
FIG. 27 is a fragmentary vertical cross-sectional view of a film loading device of the invention, with a loading slot opened.
Figure 28:
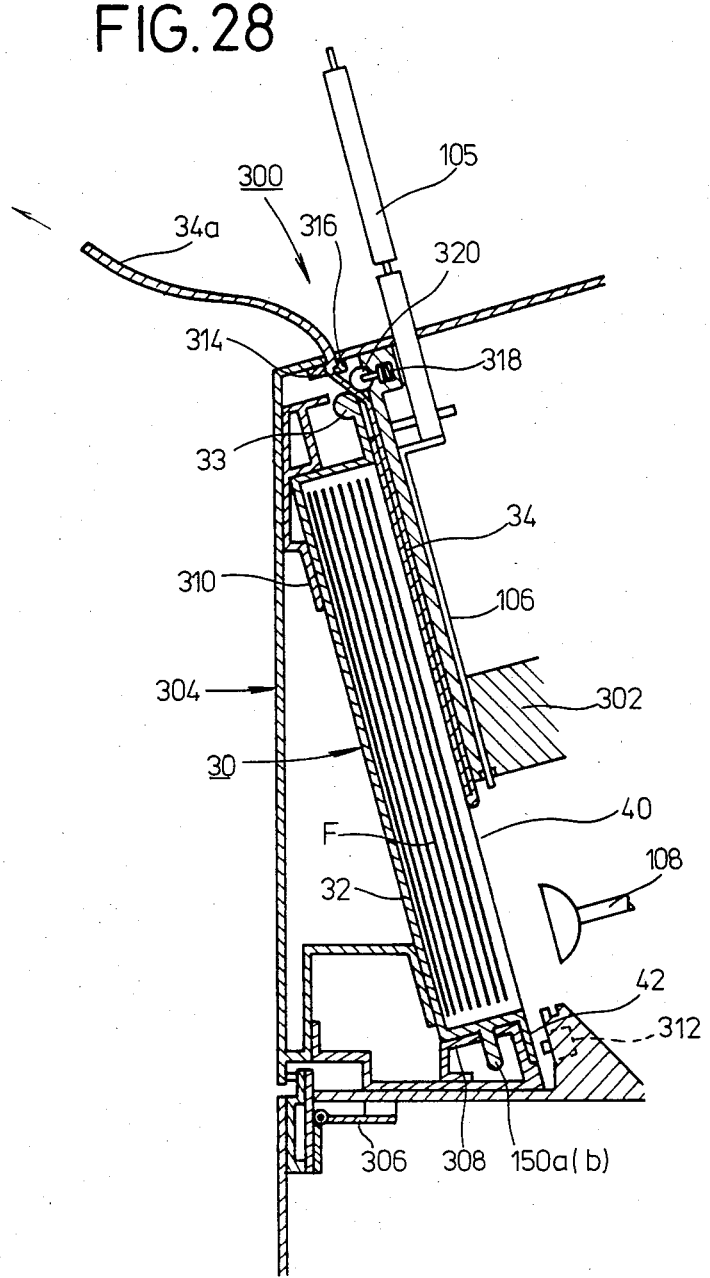
FIG. 28 is a fragmentary vertical cross-sectional view of the film loading device of FIG. 27, with the loading slot closed.
Figure 29:
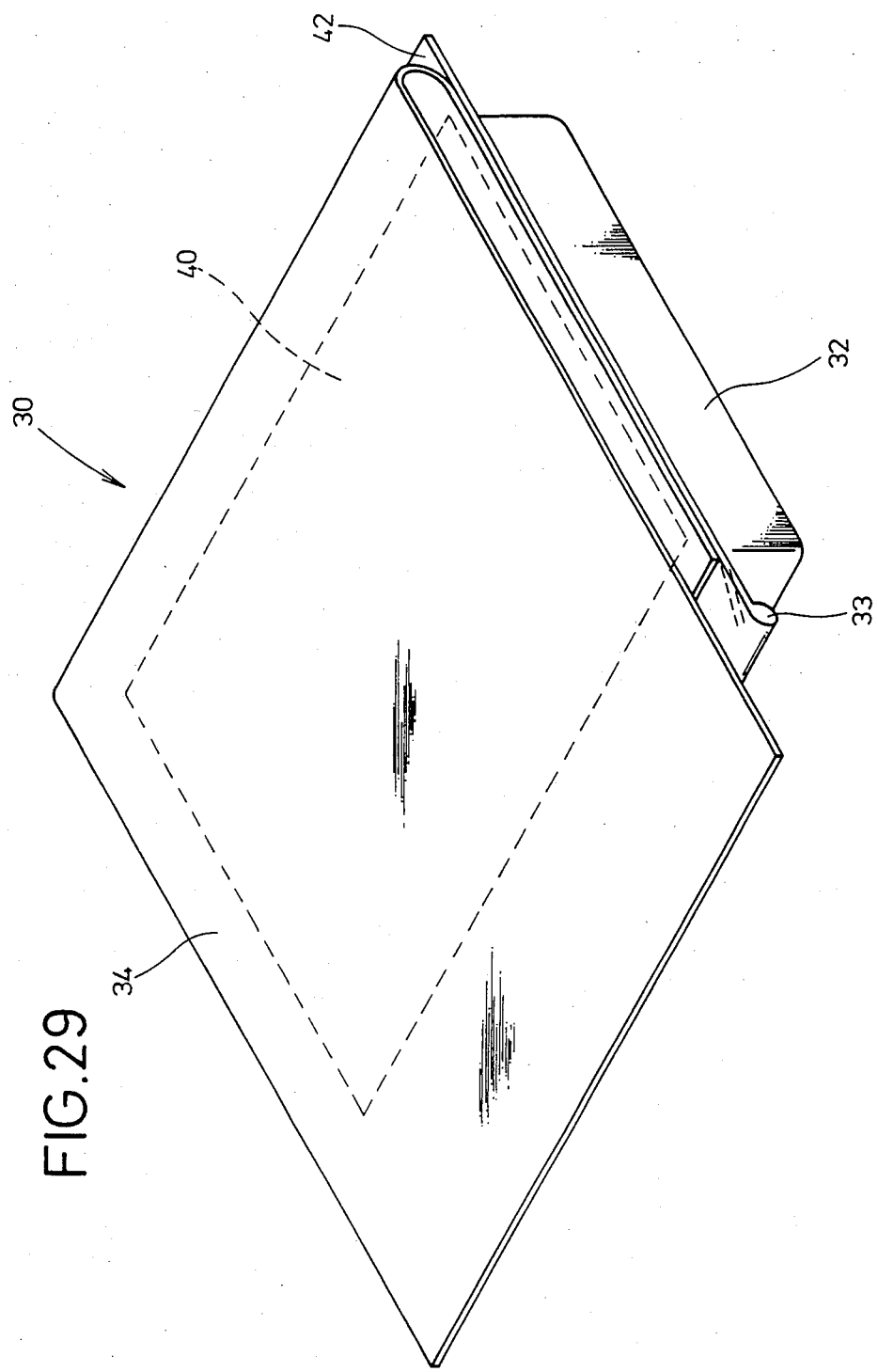
FIG. 29 is a perspective view of a sheet film package for use with the film loading device shown in FIGS. 27 and 28.

FIGS. 27 and 28 show a film loading device 300 according to the present invention. The film loading device 300 is basically constructed of a frame 302 in an image recorder and a cover 304 hinged to the frame 302 for opening and closing a loading slot for a film package 30. As illustrated in FIG. 29, the film package 30 essentially comprises a tray 32 and a cover member 34 of a flexible material for closing a film access opening 40 defined in the tray 32. The film access opening 40 is partly defined by a peripheral edge which projects outwardly into a surface portion 42. The tray 32 has an engaging portion 33 with its distal edge of a substantially cylindrical cross section, the engaging portion 33 being positioned remotely from the surface portion 42 and inclined in its free or normal state in an upward direction away from the bottom wall of the tray 32, as indicated by the broken lines. The cover member 34 is of the same length as those of cover members of the previous embodiments.

The cover 304 has a lower end pivotally coupled by a hinge 306 to the frame 302. The cover 304 includes a lower receiver base 308 and an upper receiver base 310 respectively on its lower and upper ends for mounting the film package 30 in position. The receiver bases 308, 310 are disposed such that when the film package loading slot is closed, the film access opening 40 of the film package 30 is directed obliquely upwardly.

A limit switch 312 is mounted in the frame 302 and detects when the package 30 is loaded, by being operated by the distal end of the surface portion 42 of the package 30 when the package loading slot is closed. A first light-shielding block 314 is disposed on the upper end of the cover 304. A second light-shielding block 316 is disposed on the upper end of the frame 302 and positioned so that it will be disposed near the first light-shielding block 314 when the package loading slot is closed. The second light-shielding block 316 has a step for bending the end portion of the cover member 34 to prevent extraneous light from entering the loading slot.

Figure 30:
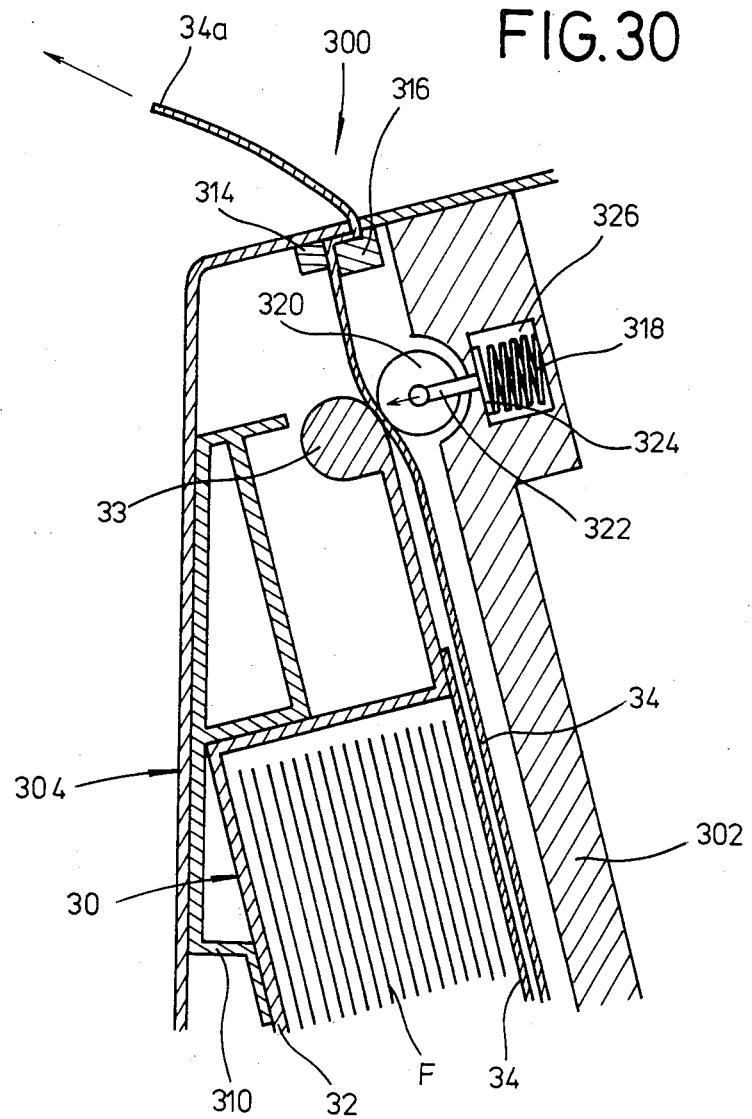
FIG. 30 is an enlarged fragmentary vertical cross-sectional view of the film loading device of FIGS. 27 and 28.

A light-shielding means 320 comprising a cylindrical roller is rotatably mounted on the frame 302 in the vicinity of the second light-shielding block 314, the roller 320 being normally urged by a coil spring 318 to project toward the cover 304. As illustrated in FIG. 30, the roller 320 has its opposite ends rotatably supported by respective bearings 322. A plate 324 is attached to the distal ends of the bearings 322 and is pressed by a coil spring 318 disposed in a chamber 326 defined in the frame 302. The roller 320 is thus normally urged by the coil spring 328 via the bearings 322 to move toward the cover 304.

Operation and advantages of the film loading device thus constructed will be described below.

First, the cover 304 is angularly moved about the hinge 306 to open the package loading slot as shown in FIG. 27. Then, the package 30 is mounted in the cover 304 by bringing the cover 304 into abutment against the receiver bases 308, 310 and fitting the pins 150a, 150b on the tray 32 into the holes 162a, 162b of the lower receiver base 308. The package 30 is now loaded in an inclined position in the cover 304. At this time, the end 34a of the cover member 34 which covers the film access opening 40 of the package 30 is lead out of the cover 304 over the engaging portion 33 of the tray 32. The cover 304 is then turned about the hinge 306 to close the package loading slot.

The engaging portion 33 of the package 30 pushes the roller 320 on the frame 302 through the cover member 34. Since the roller 320 is biased by the coil spring 318 toward the cover 304, the cover member 34 is gripped between the engaging portion 33 and the roller 320 without any gap therebetween, as shown in FIG. 30. The cover member 34 is also pinched by the first and second light-shielding blocks 314, 316, with the end 34a extending out of the film loading device 300. Consequently, the interior of the film loading device 300 is fully shielded from extraneous light by the cover 304 and the roller 320.

The surface portion 42 of the film package 30 that has been loaded into the film loading device 300 actuates the limit switch 312 in the film loading device 300. The film package 30 in the film loading device 300 is therefore detected by the limit switch 312, which gives an indication to prevent the loading slot from being inadvertently opened to expose the stacked films in the package 30 to extraneous light.

Then, the end 34a of the cover member 34 is pulled out by the operator to peel the cover member 34 off the tray 32 while the cover member 34 is being gripped between the engaging portion 33 and the roller 320. The cover member 34 can smoothly be pulled out of the film loading apparatus 300 by rotation of the roller 320. The film access opening 40 is now opened into the film loading device 300 without exposure to extraneous light. The shutter member 105 and the suction mechanism 108 will be operated in the same manner as desribed above.

Figure 31:
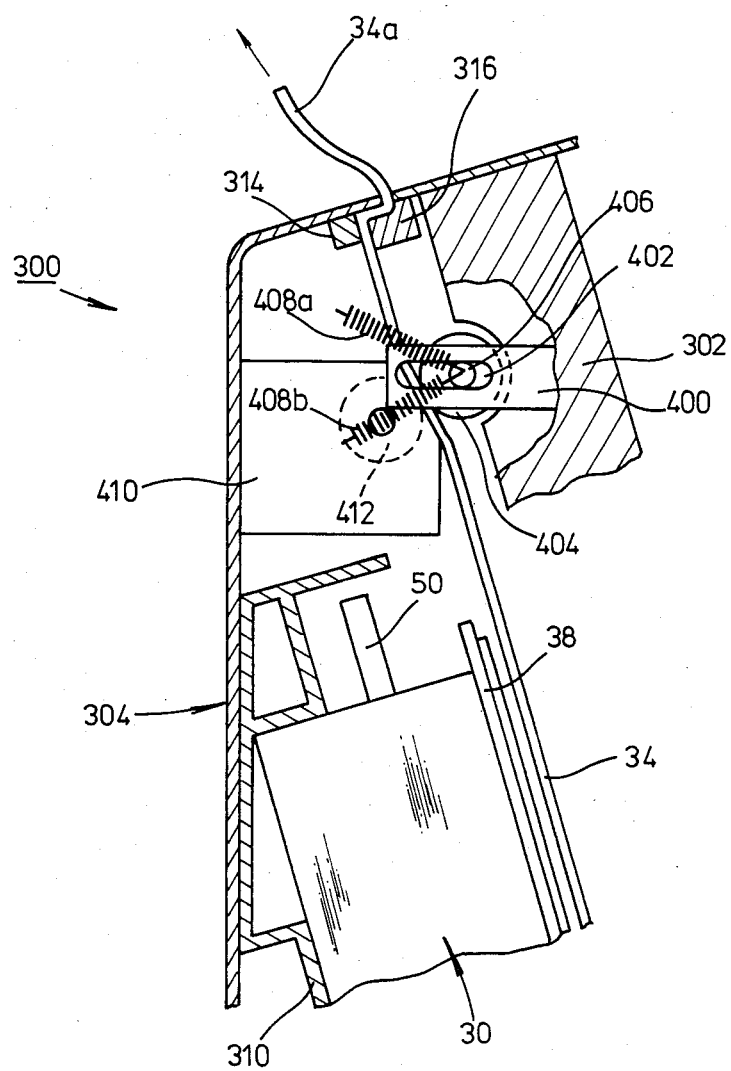
FIG. 31 is a fragmentary vertical cross-sectional view of a light-shielding means of another embodiment in the film loading device.

FIG. 31 shows a film loading device 300 with another light-shielding means in accordance with another embodiment of the present invention. The frame 302 of the film loading device 300 has a bearing 400 with an oblong hole 402 defined therein. A roller 404 has a rotatable shaft 406 fitted in the oblong hole 402. The rotatable shaft 406 is biased toward the cover 304 by two coil springs 408a, 408b having ends fixedly mounted in the loading slot on its side closer to the cover 304. The roller 404 is therefore normally urged to move toward the cover 304. A roller 412 is rotatably mounted by a support plate 410 on the upper end of the cover member 304.

When the loading slot is opened, the end of the cover member 34 which closes the film access opening of the package 30 is led out of the film loading device 300 across the roller 412. Upon closing the cover 304, the roller 412 is pressed toward the roller 402 in the frame 302 with the cover member 34 interposed therebetween, thereby pushing the roller 404 toward the frame 302 along the oblong hole 402 of the bearing 400. At this time, the roller 404 is tensioned toward the cover member 34 under the bias of the coil springs 408a, 408b, so that the cover member 34 is gripped between the rollers 412, 404 without any gap therebetween for thereby preventing entry of extraneous light into the film loading device 300 through the cover member 34.

Figure 32:
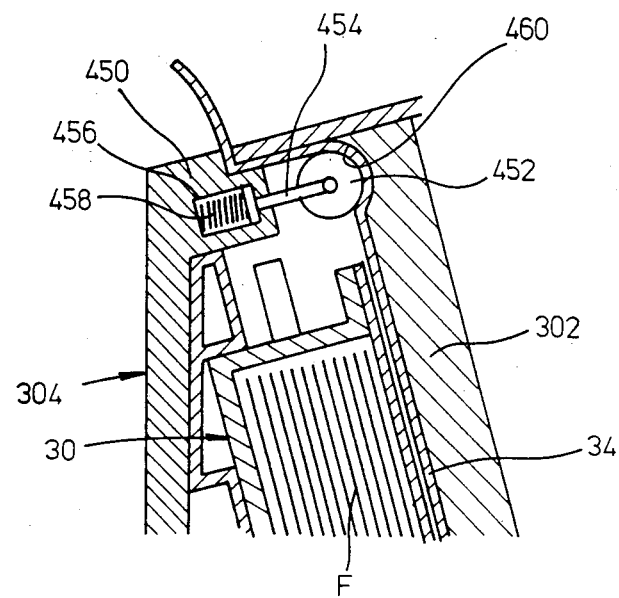
FIG. 32 is a fragmentary vertical cross-sectional view of a light-shielding means of still another embodiment in the film loading device.

The light-shielding means may be constructed as shown in FIG. 32. A light-shielding block 450 is integrally disposed on the upper end of the cover 304, and a roller 452 is supported by a bearing 454 on the light-shielding block 450. The roller 452 is rotatably mounted on one end of the bearing 454, whereas the other end of the bearing 454 is positioned in a chamber 456 defined in the light-shielding block 450 and normally urged to move toward the frame 302 by a coil spring 458 disposed in the chamber 456. The frame 302 has a recess 460 having a curved surface complementary to the peripheral surface of the roller 452.

The cover member 34 of the film package 30 loaded in the cover 304 is gripped between the roller 452 and the curved surface of the recess 460. The interior of the film loading device 300 is therefore held in a light-shielded condition by the roller 452 and the recess 460 between which the cover member 34 is pinched.

With the principles of the present invention as exemplified by the various embodiments thereof, therefore, a film package can be loaded under a light-shielded condition into a film loading device combined with an image recorder, for example, and a light-shielding cover member of the film package can easily be peeled off a tray of the film package in a bright environment. When the cover member is peeled off, extraneous light is prevented from entering the film loading device, so that a stack of unexposed image recording carriers such as sheet films stored in the film package will not be exposed to unwanted extraneous light.

The film package is relatively simple in construction, and no conventional heavy dedicated magazine is required. The film package of the invention can be used as such a magazine.

Since the films can easily be loaded in a bright condition, the process of loading the films can be performed highly efficiently.

Although certain preferred embodiments have been shown and described, it should be understood that many changes and modifications may be made therein without departing from the scope of the appended claims.

What is claimed is:

1. A sheet film package comprising:
   a tray for storing a stack of sheet films, said tray having a film access opening; and
   a flexible cover member peelably attached to said tray in covering relation to said film access opening for shielding the sheet films in said tray from extraneous light, said cover member having a length selected such that it is folded back on itself at one end of said tray and has an end portion which extends over the other end of said tray and which will be exposed from a loading device when the sheet film package is loaded in the loading device.

2. A sheet film package according to claim 1, wherein said tray has at least one projecting portion for positioning and fixing the sheet film package when it is loaded in the loading device, said projecting portion being engageable in a corresponding portion of the loading device to prevent said tray from being displaced when said cover member is peeled off said tray.

3. A sheet film package according to claim 2, wherein said tray comprises a box-shaped lower portion and a plate-like upper portion integral therewith and projecting outwardly therefrom, said at least one projecting portion being a distal end of said plate-like upper portion.

4. A sheet film package according to claim 2, wherein said tray comprises a box-shaped lower portion and a plate-like upper portion integral therewith and projecting therefrom, said at least one projecting portion being disposed on a leading end of said lower portion in the direction in which the sheet film package is inserted into the loading device, said lower portion having a grip on a trailing end thereof in said direction.

5. A sheet film package according to claim 4, wherein a distal end of said plate-like upper portion and a distal end of said projecting portion lie in one plane, said distal ends being positionable in a substantially horizontal plane to direct the sheet film package in an erected position.

6. A sheet film package according to claim 1, wherein said tray includes a box-shaped lower portion having a bottom wall with vent means disposed thereon and positioned for confronting relation to a suction disk for delivering the sheet films from said tray.

7. A sheet film package according to claim 1, wherein said tray includes a box-shaped lower portion having a bottom wall with a plurality of stiffening ribs formed on an outer surface thereof.

8. A sheet film package according to claim 1, wherein said tray includes a box-shaped lower portion having steps of sawtooth cross section on an inner surface of a leading end of said lower portion in the direction in which the sheet film package is inserted into the loading device.

9. A sheet film package according to claim 2, wherein said tray comprises a box-shaped lower portion and a plate-like upper portion integral therewith, said upper portion having an engaging portion projecting into said film access opening from an inner surface of a leading end thereof in the direction in which the sheet film package is inserted into the loading device, for preventing the films from dropping out of said tray.

10. A sheet film package according to claim 9, wherein said engaging portion has a slanted or curved surface inclined toward a bottom of said lower portion of the tray, on which the sheet films will be placed.

11. A sheet film package according to claim 9, wherein said engaging portion is in the form of a plate, said film access opening being defined by a distal end of said engaging portion and one end of said upper portion and having a length smaller than the length of each of said sheet films.

12. A sheet film package according to claim 1, wherein said tray has on one end thereof an engaging portion for cooperating with light-shielding means in the loading device when said tray is loaded into the loading device.

13. A sheet film package according to claim 12, wherein said tray comprises a lower portion for storing the sheet films and an upper portion integral with said lower portion and having said film access opening, said upper portion having on an end thereof an engaging portion extending outwardly and inclined in a direction away from a bottom of said lower portion.

14. A sheet film package according to claim 13, wherein said engaging portion has a slot defined therein for allowing the sheet film package to be gripped therethrough.

15. A sheet film package according to claim 13, wherein said engaging portion has a substantially cylindrical distal end.

16. A sheet film package according to claim 1, wherein said other end of said tray includes a break-off joined portion separable from said tray, so that said break-off joined portion and said end portion of the cover member will be pulled to open said film access opening to allow the sheet films to be picked up from said tray.

17. A sheet film package according to claim 16, wherein said tray comprises a box-shaped lower portion and a plate-like upper portion integral therewith and projecting therefrom, said upper portion having a recess defined in a trailing end thereof in the direction in which the sheet film package is inserted into the loading device, said break-off joined portion being separably joined through said recess to said tray, said end portion of the cover member being bonded to said break-off joined portion.

18. A sheet film package according to claim 1, wherein said cover member includes at least a single integral portion of a flexible material which closes said film access opening.

19. A sheet film package according to claim 1, wherein said end portion of the cover member which will be exposed from the loading device includes a grip tongue narrower than the cover member itself which closes said film access opening, said grip tongue being defined by cutting off said end portion.

20. A sheet film package according to claim 1, wherein said cover member has a portion attached to a leading end of said tray in the direction in which the sheet film package is inserted into the loading device, further including a guide member disposed on said portion of the cover member, said cover member being peelable from said tray until the cover member abuts against said guide member for thereby opening said film access opening.

21. A sheet film package according to claim 1, further including adhesive layers of different bonding strengths between said cover member and said tray, said cover member being peelable up to the adhesive layer of stronger bonding strength for thereby opening said film access opening.

22. A sheet film package according to claim 1, wherein said cover member bears marks thereon, so that said cover member will be pulled out of the loading device until said marks are exposed thereby to indicate that said film access opening has been opened to a prescribed degree.

23. A sheet film package according to claim 1, wherein said end portion of said cover member is peelably bonded to the other end of said tray or a portion of said cover member which is attached to said tray.

24. A sheet film package according to claim 1, wherein said tray and said cover member are joined to each other such that when peeling said cover member off, said tray, the force applied to peel said cover member is concentrated on a single point during at least an initial period of peeling said cover member.

25. A sheet film package according to claim 24, wherein said tray and said cover member are joined to each other in a pattern inclined to a direction normal to the direction in which said cover member will be peeled off said tray.

26. A sheet film package according to claim 24, wherein said tray and said cover member are joined to each other in a pattern having a width which is gradually reduced in a direction extending obliquely to the direction in which said cover member will be peeled off said tray.

* * * * *